US010640358B2

(12) United States Patent
Zitkovic, Jr. et al.

(10) Patent No.: US 10,640,358 B2
(45) Date of Patent: May 5, 2020

(54) CAPLESS REFILL ADAPTER FOR A FLUID REFILLING SYSTEM

(71) Applicant: Ford Global Technologies, LLC, Dearborn, MI (US)

(72) Inventors: Mike Terrence Zitkovic, Jr., Dearborn, MI (US); Xiankai Song, Canton, MI (US); Christopher Anthony Danowski, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 199 days.

(21) Appl. No.: 15/629,535

(22) Filed: Jun. 21, 2017

(65) Prior Publication Data
US 2018/0370786 A1 Dec. 27, 2018

(51) Int. Cl.
*B67D 7/02* (2010.01)
*B60K 15/04* (2006.01)
(Continued)

(52) U.S. Cl.
CPC ............ *B67D 7/0288* (2013.01); *B60K 13/04* (2013.01); *B60K 15/035* (2013.01); *B60K 15/04* (2013.01);
(Continued)

(58) Field of Classification Search
CPC ................ B67D 7/0288; F01N 3/2066; F01N 2610/1413; B60K 15/035; B60K 15/0406; B60K 15/04; B60K 13/04; B60K 2015/03523; B60K 2015/0461; B60K 2015/0432; B60K 2015/03309; B60K 2015/03217
See application file for complete search history.

(56) References Cited

U.S. PATENT DOCUMENTS 5,732,840 A    3/1998   Foltz
6,446,826 B1   9/2002   Foltz et al.
(Continued)

FOREIGN PATENT DOCUMENTS

DE          10304556 A1   9/2004
DE   202011105302 U1   1/2013
(Continued)

OTHER PUBLICATIONS

Song, X. et al., "Non-Linear Spring Mechanism," U.S. Appl. No. 15/585,650, filed May 3, 2017, 46 pages.

*Primary Examiner* — Nicolas A Arnett
(74) *Attorney, Agent, or Firm* — Geoffrey Brumbaugh; McCoy Russell LLP

(57) ABSTRACT

Methods and systems are provided for an adapter for a fluid refilling system. In one example, an adapter configured for use with a diesel exhaust fluid (DEF) system may include a first end configured to couple with a DEF refill passage, a second end including an aperture shaped to receive a DEF nozzle, a pivotable door closing the aperture and biased against the aperture by a biasing member, and a magnetic ring positioned within the adapter and downstream of the pivotable door. The pivotable door may be formed of a material permeable to DEF vapors and may include a plurality of vent holes configured to flow vapors from the DEF system to atmosphere.

18 Claims, 17 Drawing Sheets

(51) Int. Cl.
*F01N 3/20* (2006.01)
*B60K 15/035* (2006.01)
*B60K 13/04* (2006.01)
*B60K 15/03* (2006.01)

(52) U.S. Cl.
CPC ........ B60K 15/0406 (2013.01); F01N 3/2066 (2013.01); *B60K 2015/03217* (2013.01); *B60K 2015/03309* (2013.01); *B60K 2015/03523* (2013.01); *B60K 2015/0432* (2013.01); *B60K 2015/0461* (2013.01); *F01N 2610/1413* (2013.01)

(56) References Cited

U.S. PATENT DOCUMENTS

| | | | |
|---|---|---|---|
| 6,945,290 B1 * | 9/2005 | Benjey | B60K 15/03504 141/302 |
| 7,182,111 B2 | 2/2007 | McClung et al. | |
| 7,661,550 B2 | 2/2010 | Feichtinger | |
| 8,371,344 B2 * | 2/2013 | Vandervoort | B60K 15/0406 123/1 A |
| 8,714,214 B2 | 5/2014 | Cisternino | |
| 8,726,950 B2 | 5/2014 | Miller et al. | |
| 8,800,611 B2 | 8/2014 | Tsiberidis | |
| 9,315,098 B2 * | 4/2016 | Lee | B60K 15/03519 |
| 9,610,836 B2 * | 4/2017 | Szymusiak | B60K 15/035 |
| 9,644,518 B2 * | 5/2017 | Ham | B67D 7/0294 |
| 9,676,272 B2 * | 6/2017 | Legueux | B60K 13/04 |
| 2002/0005227 A1 | 1/2002 | Foltz et al. | |
| 2010/0006178 A1 | 1/2010 | Muth et al. | |
| 2010/0132838 A1 | 6/2010 | Cisternino et al. | |
| 2013/0075399 A1 | 3/2013 | Hagano | |
| 2014/0060699 A1 * | 3/2014 | Szymusiak | B60K 15/035 141/285 |
| 2014/0091095 A1 | 4/2014 | Hagano et al. | |
| 2014/0183192 A1 | 7/2014 | Aitken et al. | |
| 2014/0332529 A1 | 11/2014 | Ryu et al. | |
| 2015/0102031 A1 | 4/2015 | Yoshida et al. | |
| 2016/0003122 A1 * | 1/2016 | Ham | B67D 7/0294 60/295 |
| 2016/0263991 A1 * | 9/2016 | Koukan | B60K 15/035 |

FOREIGN PATENT DOCUMENTS

| | | |
|---|---|---|
| EP | 2340956 A2 | 7/2011 |
| EP | 2719566 A1 | 4/2014 |
| WO | 2013034575 A1 | 3/2013 |
| WO | 2015094478 A1 | 6/2015 |

\* cited by examiner

CAPLESS REFILL ADAPTER FOR A FLUID REFILLING SYSTEM

FIELD

The present description relates generally to methods and systems for nozzle receiving systems of vehicles, and more particularly, to nozzle receiving systems that are configured to store fluid within a reservoir.

BACKGROUND/SUMMARY

Fluid refilling systems, such as a diesel exhaust fluid refilling system of a motorized vehicle, often include a reservoir for storing fluid and a filler neck configured to receive a fluid nozzle. The fluid nozzle may be coupled to an external fluid source such as a bottle, fluid pumping station, etc., and fluid may flow from the fluid nozzle into an inlet of the filler neck. In some examples, the inlet of the filler neck may be coupled to the reservoir by a fluid passage such that fluid flows from the nozzle, through the fluid passage, and into the reservoir.

One example approach of a fluid refilling system is shown by Melzer et al. in German Patent DE 202011105302. Therein, a filler neck is disclosed including a first end shaped to receive a dispenser nozzle and a second end connecting the filler neck to a liquid reservoir. The filler neck may be sealed at the first end by coupling a removable cap with a threaded surface of the filler neck. The filler neck includes a magnetic ring positioned upstream of a pivotable flap relative to a fluid flow direction of the filler neck. The magnetic ring actuates a valve within the dispenser nozzle when the dispenser nozzle is inserted into the filler neck so that fluid may flow from the dispenser nozzle into the filler neck. A vent line connection of the filler neck is positioned downstream of the pivotable flap. Another example approach of a fluid refilling system is shown by Körber et al. in European Patent EP 2340956. Therein, a connector for a filling pipe is disclosed including an external threaded portion adapted to couple with a closure cap. The connector includes a ring magnet positioned upstream of a spring-loaded flap. A vent tube is positioned downstream of the spring-loaded flap and extends away from a connecting portion of the connector.

However, the inventors herein have recognized potential issues with such systems. As one example, threaded surfaces included by a filler neck configured to be sealed via a removable cap may increase an overall length of the filler neck. Additionally, coupling and decoupling the cap with the filler neck increases an amount of time to refill a reservoir fluidly coupled to the filler neck and increases a likelihood of improper sealing of the filler neck, accidental loss of the cap, etc. As another example, positioning a ring magnet upstream of a pivotable flap such as in the example shown by the '956 patent may additionally increase the overall length of the filler neck, thereby decreasing a usability of the filler neck in locations having a decreased amount of working space (e.g., within a compartment of a vehicle).

In one example, the issues described above may be addressed by an adapter comprising: a body including a first end shaped to couple with a diesel exhaust fluid (DEF) refill passage and a second end including an aperture shaped to receive a DEF nozzle; a pivotable door sealing the aperture and forming an external surface of the adapter; and a magnetic ring positioned within the body, downstream of the pivotable door between the first end and second end.

As one example, the aperture is sealed by the pivotable door with no additional caps, plugs, lids, etc. The pivotable door may be biased against the aperture by a biasing member formed of a material that is non-reactive with DEF. The biasing member may be shaped such that an amount of force to pivot the pivotable door from a closed position to a partially opened positions is less than an amount of force to pivot the pivotable door from the partially opened position to a fully opened position. The pivotable door is formed of a material permeable to DEF and includes a plurality of venting channels configured to flow DEF vapor out of the adapter. The adapter further includes a main ventilation passage extending in radial direction relative to a central axis of the adapter, and a plurality of secondary ventilation passages extending in an axial direction relative to the central axis.

By increasing the amount of ventilation of the adapter via the ventilation passages and permeable pivotable door, a length of the main ventilation passage may be reduced, thereby decreasing a diameter of the adapter. By sealing the aperture via the pivotable door and by positioning the magnetic ring downstream of the door, a length of the adapter may be reduced. In this way, the adapter may more easily be coupled to a fluid refilling system at locations having a reduced amount of working space.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-13 and FIG. 15 are shown to scale, though other relative dimensions may be used.

DETAILED DESCRIPTION

The following description relates to systems and methods for a refill adapter for a fluid refilling system. A fluid refilling system, such as the diesel exhaust fluid (DEF) system shown by FIG. 1, may be configured to flow fluid (e.g., DEF) from a fluid reservoir to one or more locations within an engine system. The fluid refilling system includes a refill adapter, such as the refill adapter shown by FIGS. 2-13. The refill adapter includes a first end shaped to couple with an inlet of a fluid passage or fluid reservoir and a second end shaped to receive a fluid nozzle. In some embodiments (such as the embodiment shown by FIG. 15), the refill adapter includes a threaded surface configured to couple with a threaded inlet of a fluid passage or threaded inlet of a fluid reservoir. The second end includes an aperture sealed by a pivotable door, with the pivotable door biased against the aperture by a biasing member. The pivotable door forms an external surface of the refill adapter such that the aperture is not sealed by any other doors, caps, etc. The second end of the refill adapter and the aperture are shaped to enable insertion of nozzles having a particular diameter and to not enable insertion of nozzles having a different diameter. An annular magnet is positioned within the refill adapter and downstream of the pivotable door in order to actuate a flow valve coupled to nozzles with the particular diameter. The refill adapter further includes a ventilation passage positioned downstream of the annular magnet for flowing vapor out of the fluid reservoir. In some examples (as described with reference to the method shown by FIG. 14), vapor may flow into the refill adapter via the ventilation passage and out of the refill adapter through the pivotable door. Vapor may flow directly through the pivotable door via a vapor-permeable sealing ring coupled to the door and a plurality of venting channels formed by the pivotable door. By positioning the annular magnet downstream of the pivotable door, a length of the refill adapter may be reduced relative to adapters that include a magnet positioned upstream of a pivotable door. Additionally, by positioning the ventilation passage downstream of the annular magnet such that vapor flows from the ventilation passage and into a flow passage of the refill adapter in an axial direction relative to a central axis of the refill adapter, a length and diameter of the refill adapter may be reduced. In this way, a size of the refill adapter may be decreased so that the refill adapter may be coupled to a fluid refilling system at locations having a decreased amount of working space.

Figure 1:
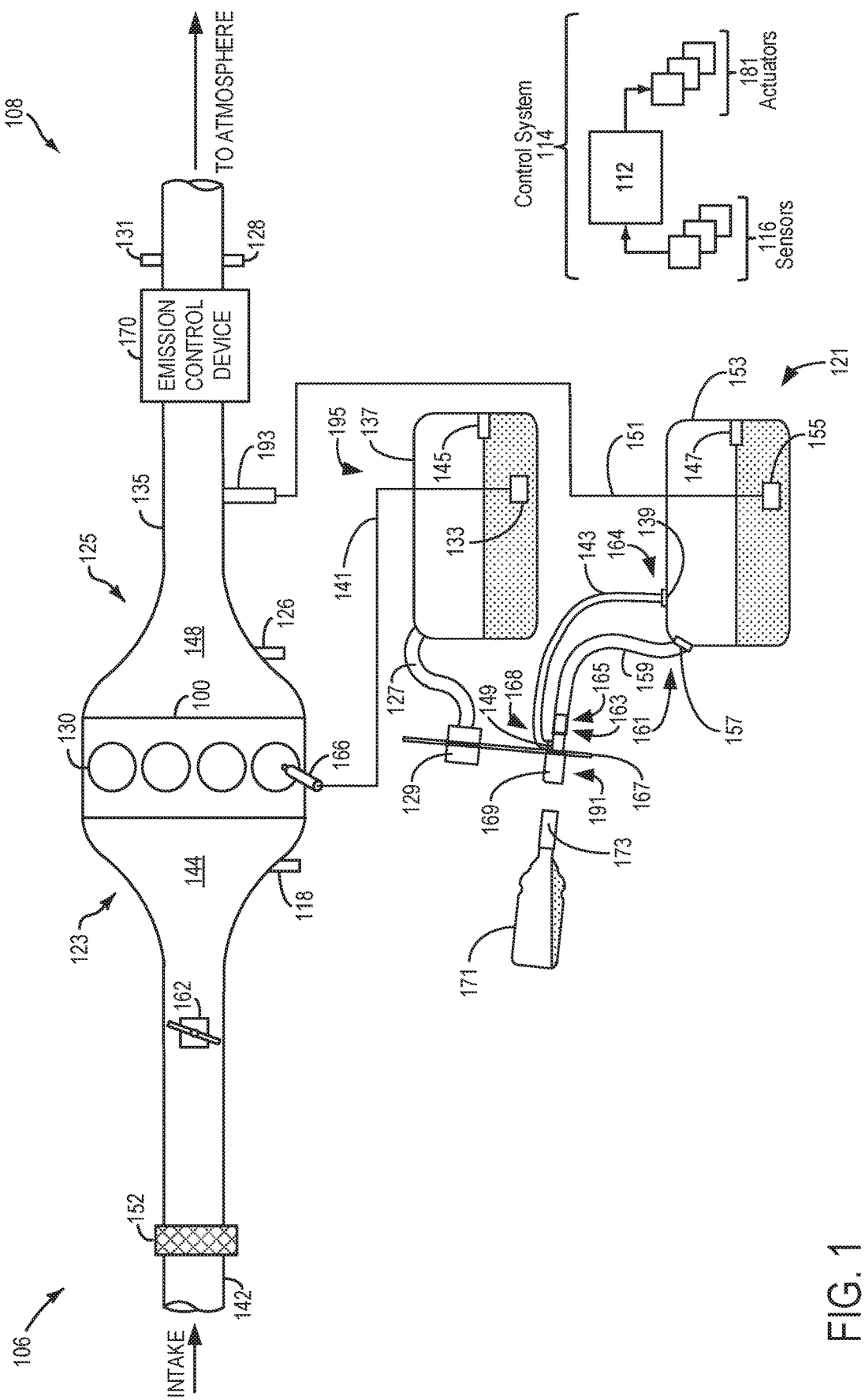
FIG. 1 shows a schematic depiction of a fluid refilling system coupled to an engine system.
Figure 2:
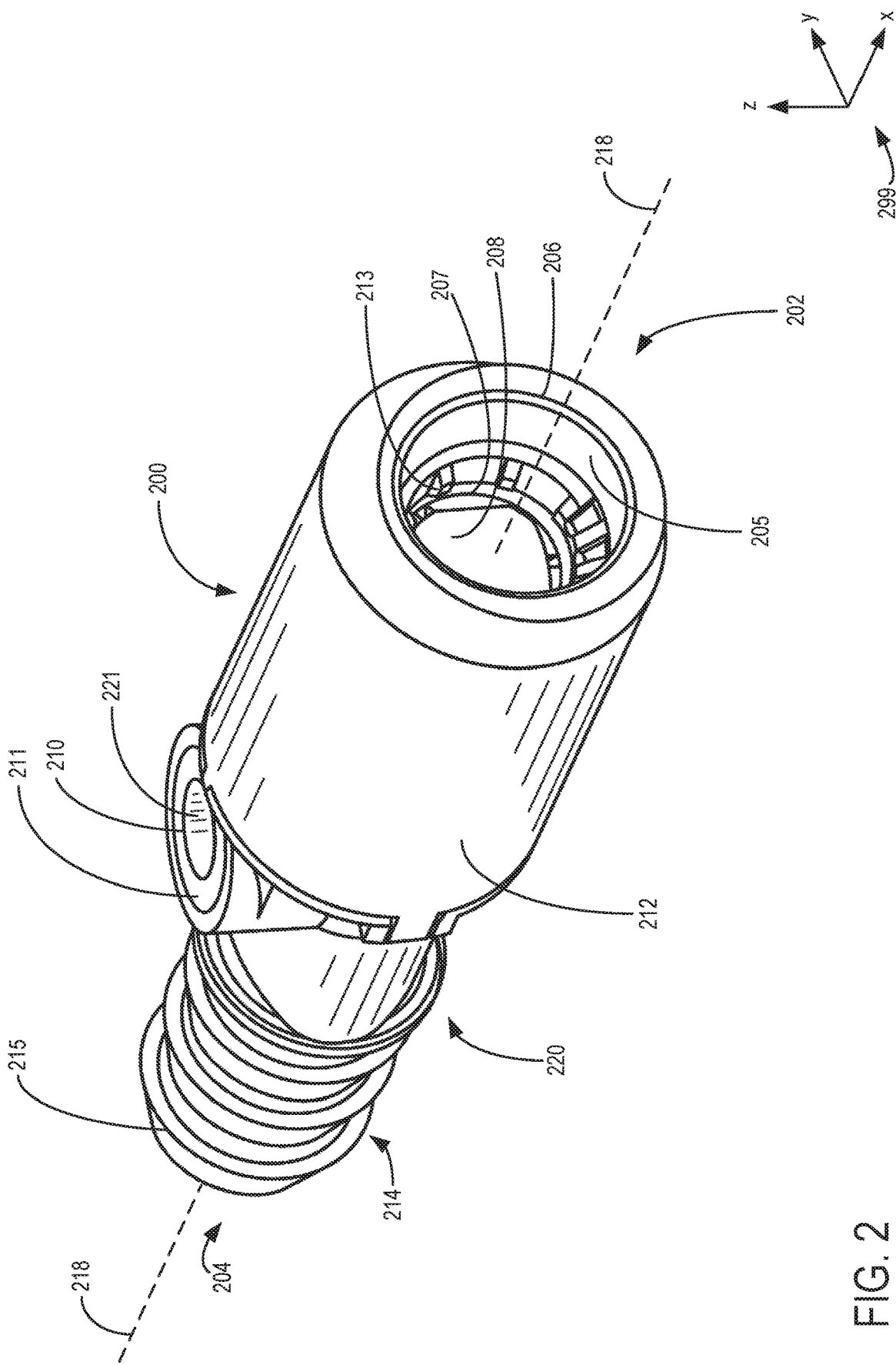
FIG. 2 shows a first perspective view of a refill adapter for a fluid refilling system.
Figure 3:
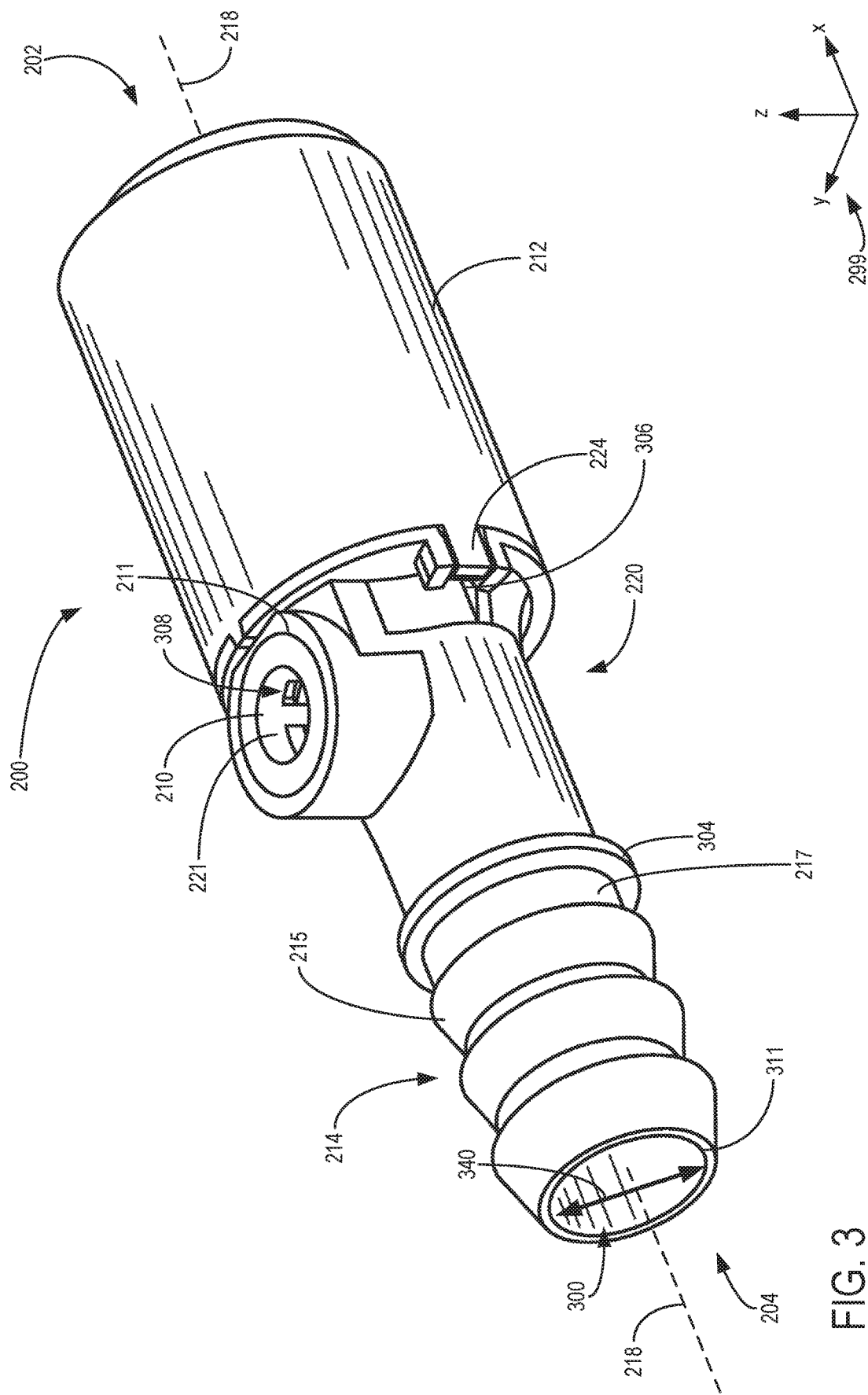
FIG. 3 shows a second perspective view of the refill adapter.
Figure 4:
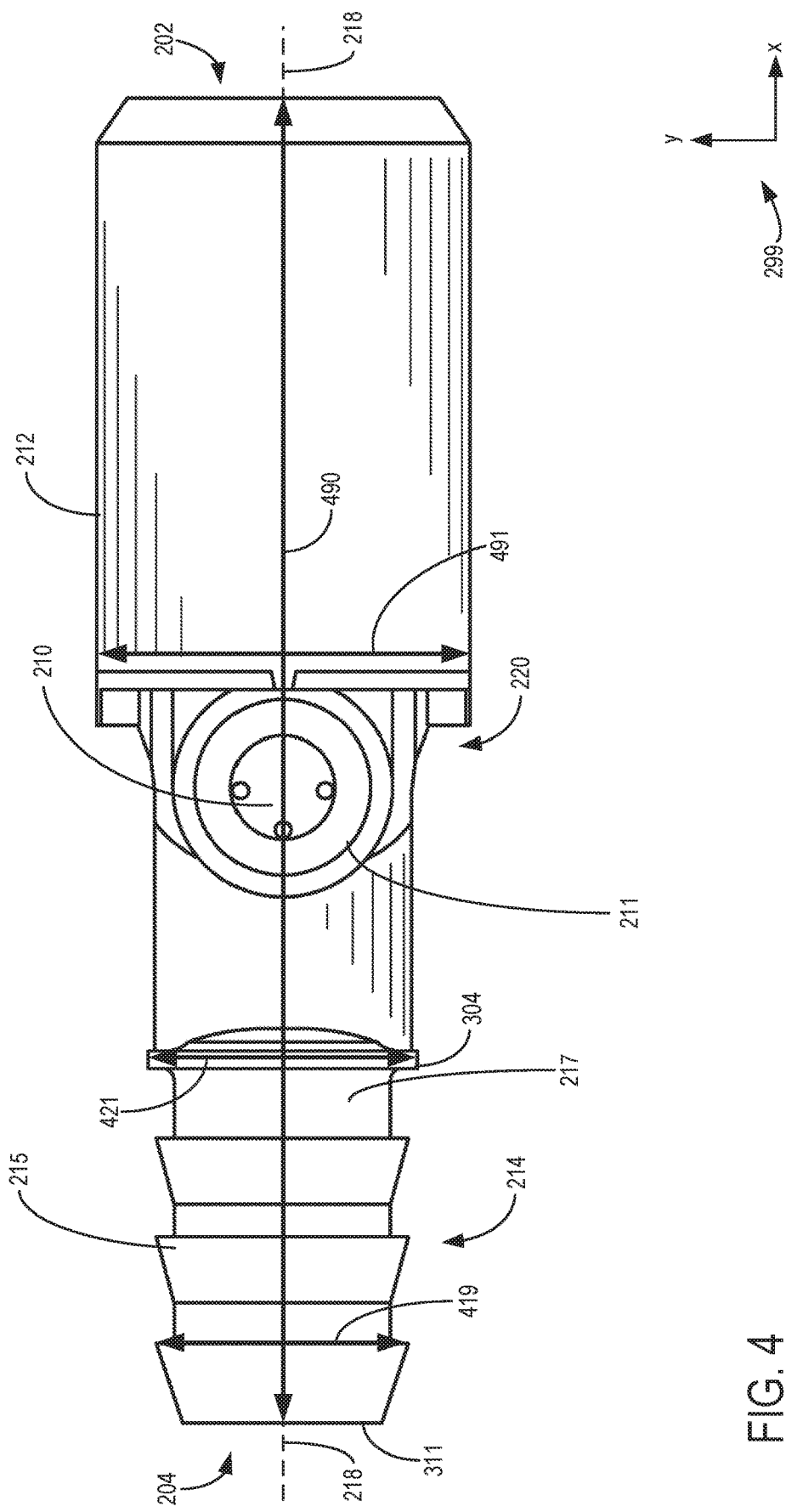
FIG. 4 shows a top view of the refill adapter.
Figure 5:
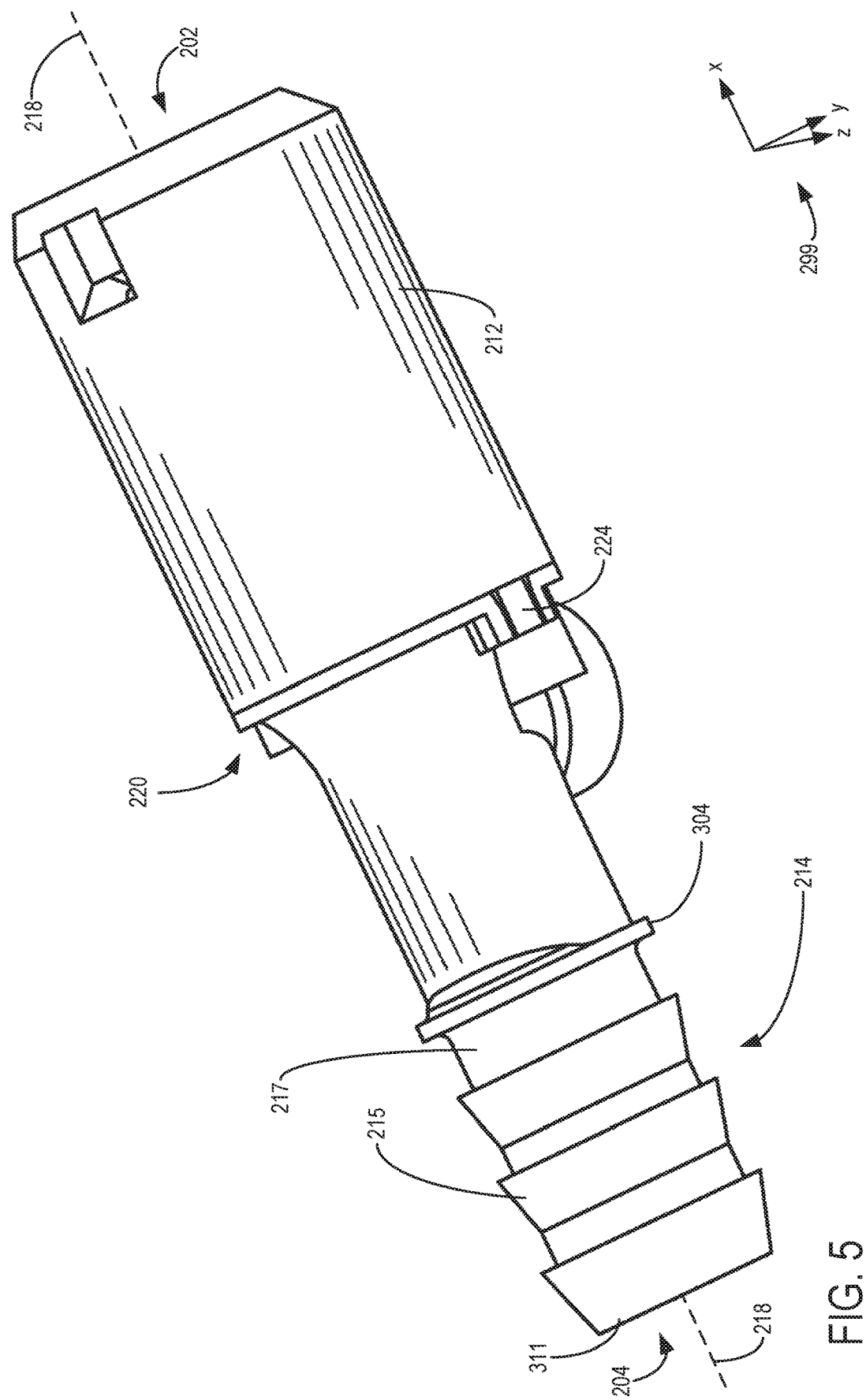
FIG. 5 shows a third perspective view of the refill adapter.
Figure 6:
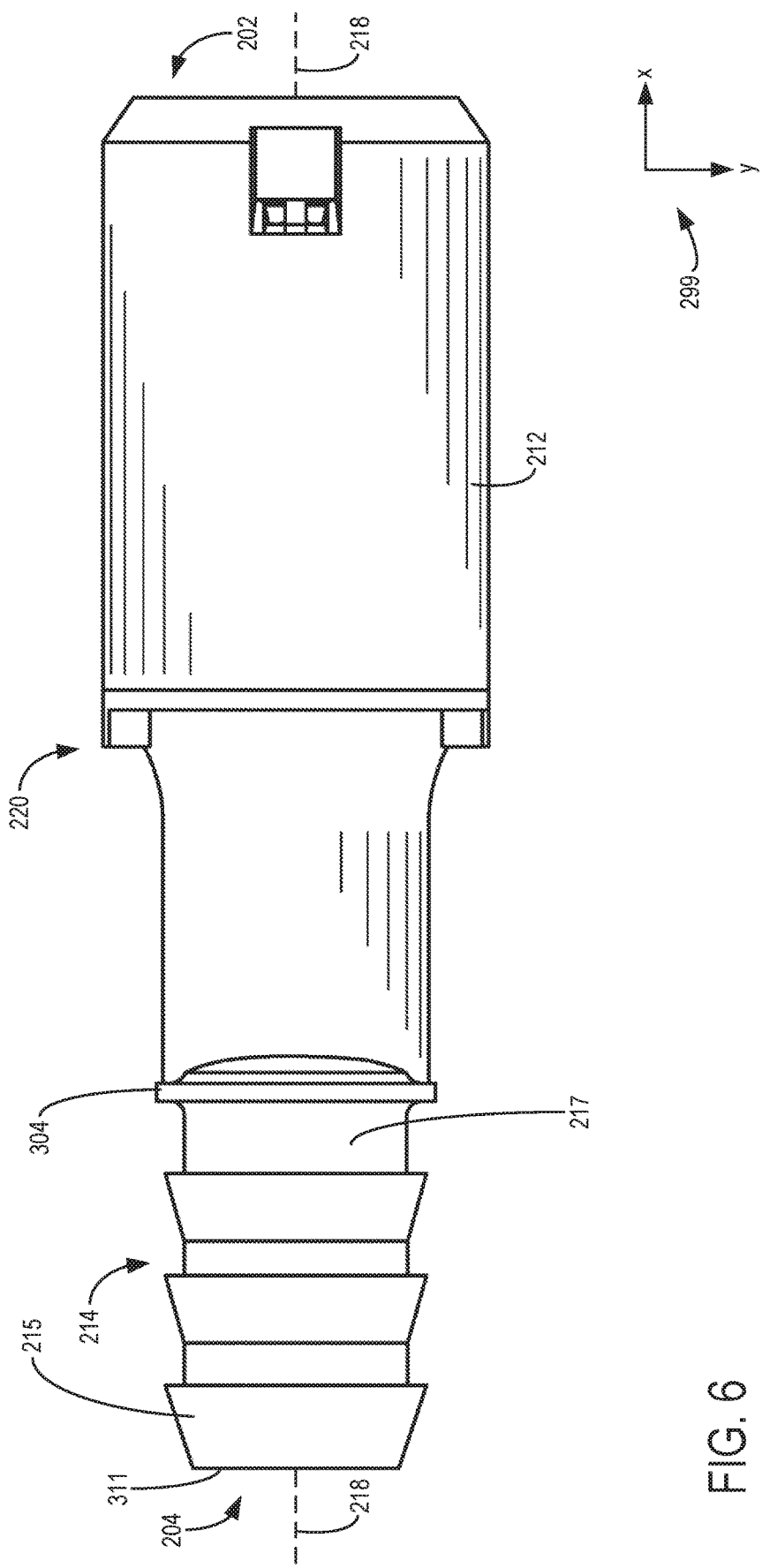
FIG. 6 shows a bottom view of the refill adapter.
Figure 7:
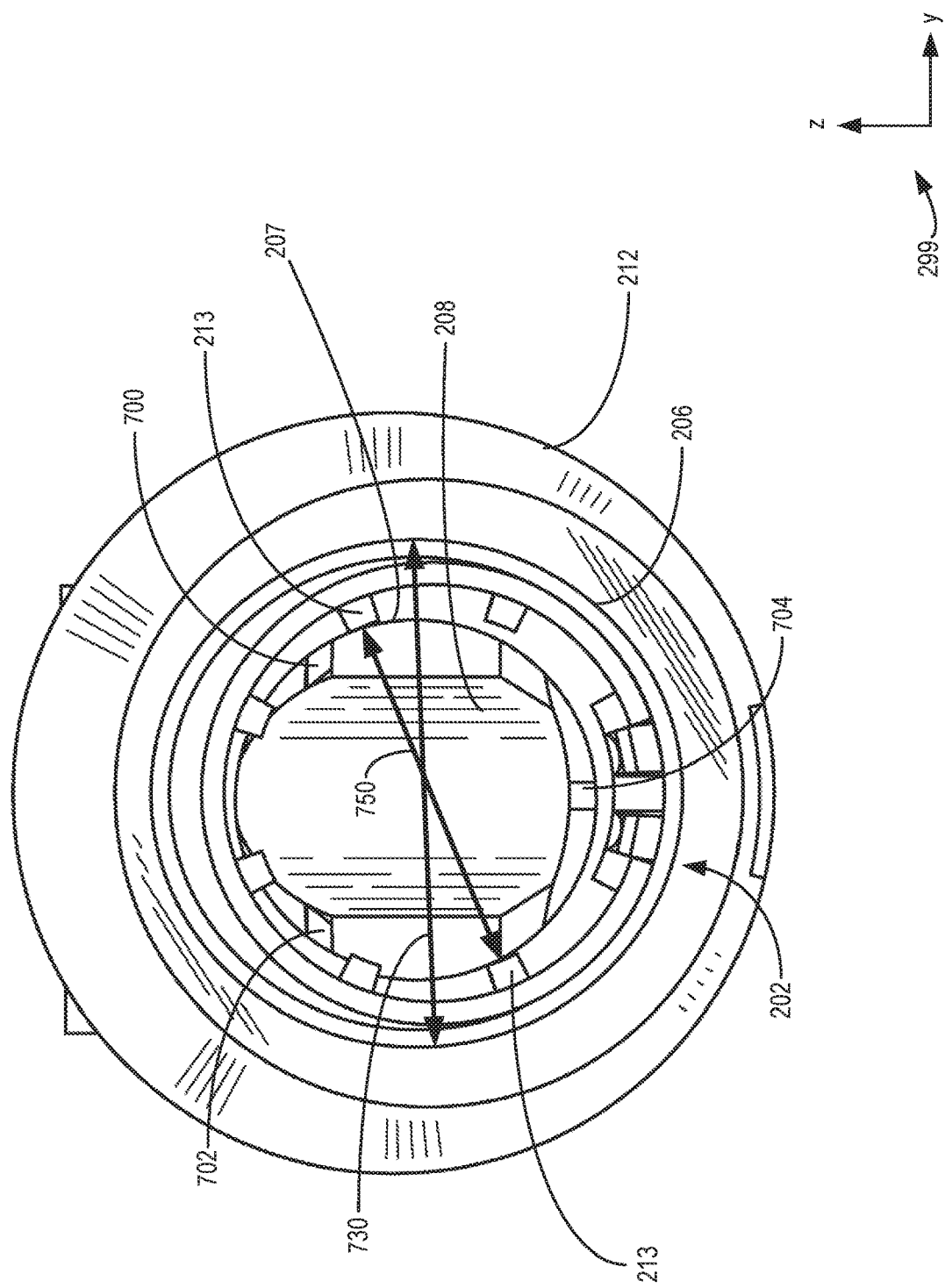
FIG. 7 shows a front view of the refill adapter.

FIG. 1 shows a schematic depiction of a vehicle system 108 including an engine system 106. In one example, the vehicle system 108 may be driven by combustion of a fuel/air mixture within cylinders 130 of engine 100 of the engine system 106. In other examples, the vehicle system 108 may be a hybrid vehicle system that can derive propulsion power from engine system 106 and/or an on-board energy storage device, such as a battery system (not shown). An energy conversion device, such as a generator (not shown), may be operated to absorb energy from vehicle motion and/or engine operation, and then convert the absorbed energy to an energy form suitable for storage by the energy storage device. In the example shown by FIG. 1, engine 100 of engine system 106 is configured to combust diesel fuel via compression of intake air within cylinders 130 and injection of diesel fuel into cylinders 130 (e.g., via fuel injectors, such as fuel injector 166). In alternate embodiments, engine 100 may include a plurality of spark plugs (not shown) configured to combust an air/fuel mixture within cylinders 130 via spark ignition.

Engine system 106 includes an engine intake 123 (which may be referred to herein as an intake system) and an engine exhaust 125 (which may be referred to herein as an exhaust system). Engine intake 123 includes an air intake throttle 162 fluidly coupled to an engine intake manifold 144 via an intake passage 142. Air may flow into intake passage 142, and particulate matter (e.g., dust, dirt, etc.) may be removed from the air via air filter 152. Engine exhaust 125 includes an exhaust manifold 148 leading to an exhaust passage 135 that routes exhaust gas to the atmosphere.

Engine exhaust 125 may include one or more emission control devices 170 mounted in a close-coupled position and configured to receive exhaust gas flowing through exhaust passage 135. The one or more emission control devices may include a three-way catalyst, lean NOx trap, diesel particulate filter, oxidation catalyst, etc. Exhaust gas may flow through emission control devices 170 via exhaust passage 135. The emission control devices 170 may be disposed in various orders and/or combinations along exhaust passage 135. For example, a diesel oxidation catalyst (DOC) may be followed downstream by a selective catalytic reduction (SCR) catalyst. SCR catalyst may be followed downstream by a diesel particulate filter (DPF). It should be understood that the emission control devices 170 of the exhaust system 125 described herein are exemplary in nature. Various other emission control devices and configurations may be included in the exhaust system 125. For example, exhaust system 125 may include an SCR followed by a DPF only. In another example, the exhaust system 125 may only include an SCR. In still another example, a DPF may be located upstream of the SCR, or a combined DPF/SCR catalyst may be used, for example.

Engine system 106 may include one or more fluid refilling systems. An example fluid refilling system is shown by FIG. 1 and referred to herein as diesel exhaust fluid (DEF) system 121. DEF system 121 is configured to store reductant (e.g., diesel exhaust fluid) from an external source (e.g., a reductant source external to vehicle system 108 as described below) and flow reductant to the exhaust system 125. As noted herein, the DEF may be a liquid reductant, such as an aqueous urea solution, stored in a storage vessel (e.g., reservoir), such as a storage tank. In one example, the DEF system 121 includes DEF tank 153 (which may be referred to herein as a storage tank or reservoir) for onboard DEF storage and additionally includes a DEF delivery line 151 (which may be referred to herein as a diesel exhaust fluid (DEF) refill passage) that couples the DEF tank to exhaust passage 135 via an injector 193 positioned at or upstream of the emission control devices 170. A fluid level sensor 147 (e.g., DEF level sensor) may be located in DEF tank 153 to provide an indication of the fluid level ("Fluid Level Input") within the DEF tank 153 to controller 112. The fluid level sensor 147 may include a float connected to a variable resistor. Alternatively, other types of fluid level sensors may be used.

The DEF tank 153 includes an inlet 157. In one example, the inlet 157 of the DEF tank 153 may be coupled to a first end 161 of a DEF flow passage 159. A second end 163 of the DEF flow passage 159 may be coupled to a rear end 165 of an adapter 169 (which may be referred to herein as a fill adapter or refill adapter) positioned at a side panel 167 of a body of the vehicle system 108 (e.g., at an exterior surface of the vehicle). A front end 191 of the refill adapter 169 is shaped to receive a nozzle 173. In the example shown by FIG. 1, nozzle 173 is coupled to an external storage vessel 171 (e.g., external to the vehicle system 108). External storage vessel 171 may be a container (e.g., a bottle) shaped to store DEF. In other examples, the external storage vessel 171 may be a different type of device configured to store DEF, such as a pumping station. DEF may flow from the nozzle 173 of the external storage vessel 171 and into the refill adapter 169 in order to increase an amount of DEF within DEF tank 153. In some examples, the DEF flow passage 159 may be omitted and the refill adapter 169 may be coupled directly to the inlet 157 of the DEF tank 153, with the DEF tank 153 positioned proximate to the side panel 167 of the body of the vehicle system 108.

In the example shown by FIG. 1, DEF system 121 includes injector 193 in line 151 which injects DEF from the DEF tank 153 into the exhaust upstream of the emissions control devices 170. Injector 193 may control a timing and amount of DEF injections via electrical signals transmitted to the injector 193 from a controller 112 of control system 114. DEF system 121 may further include a DEF pump 155. DEF pump 155 may be used to pressurize and deliver DEF into the line 151.

DEF tank 153 additionally includes a vapor outlet 139 coupled to a first end 164 of a ventilation line 143. A second end 168 of the ventilation line 143 is coupled to a main ventilation passage 149 of the refill adapter 169. In this configuration, vapors (e.g., DEF vapor) from the DEF tank 153 may flow through vapor outlet 139 and into the ventilation line 143 toward the main ventilation passage 149 of the refill adapter 169. As the vapor flows through the main ventilation passage 149, the vapor may flow out of the front end 191 of the refill adapter 169 and/or may recirculate back to the DEF tank 153 via the DEF flow passage 159. In one example, a first portion of the vapor may flow through the main ventilation passage 149 and out of the front end 191 (e.g., via one or more venting channels formed by a pivotable door of the refill adapter, as described below with reference to the embodiment of the refill adapter shown by FIGS. 2-13), and a second portion of the vapor may flow through the main ventilation passage 149 and into the DEF flow passage 159.

Engine system 106 is coupled to fuel system 195. Fuel system 195 includes a fuel tank 137 coupled to a fuel pump 133. During a fuel tank refueling event, fuel may be pumped into the vehicle from an external source through a refueling assembly 129 coupled to the fuel tank 137. The refueling assembly and the fuel tank 137 may be in fluidic communication via a fuel passage 127. Fuel tank 137 may hold a plurality of fuel blends, including fuel with a range of alcohol concentrations, such as various gasoline-ethanol blends, including E10, E15, gasoline, diesel, etc., and combinations thereof. In the example shown by FIG. 1, fuel tank 137 is configured to store diesel fuel for combustion within engine 100. A fuel level sensor 145 may be located in fuel tank 137 to provide an indication of the fuel level ("Fuel Level Input") to controller 112. The fuel level sensor 145 may include a float connected to a variable resistor. Alternatively, other types of fuel level sensors may be used. The refueling assembly 129 may include a number of components configured to enable cap-less refueling, decrease air entrapment in the assembly, decrease the likelihood of premature nozzle shut-off during refueling, as well as increase the pressure differential in the fuel tank over an entire refueling operation, thereby decreasing the duration of refueling.

Fuel pump 133 is configured to pressurize fuel delivered through fuel line 141 to the injectors of engine 100, such as example injector 166. While only a single injector 166 is shown, additional injectors are provided for each cylinder. It will be appreciated that fuel system 195 may be a return-less fuel system, a return fuel system, or various other types of fuel system.

Vehicle system 108 further includes control system 114. Control system 114 receives information (e.g., electrical signals) from a plurality of sensors 116 (various examples of which are described herein) and sending control signals to a plurality of actuators 181 (various examples of which are described herein). As one example, sensors 116 may include exhaust gas sensor 126 located upstream of the emission control device, temperature sensor 128, MAP sensor 118, and pressure sensor 131. Other sensors such as additional pressure, temperature, air/fuel ratio, and composition sensors may be coupled to various locations in the vehicle system 108. As another example, the actuators may include fuel injector 166, DEF pump 155, fuel pump 133, throttle 162, etc. The controller 112 receives signals from the various sensors 116 of FIG. 1 and employs the various actuators 181 of FIG. 1 to adjust engine operation based on the received signals and instructions stored on a memory of the controller. For example, adjusting flow of DEF from the DEF tank 153 through DEF delivery line 151 may include adjusting an energization level of the DEF pump 155 (e.g., adjusting a frequency, amplitude, duration, etc. of an electrical signal transmitted to the DEF pump 155) to increase or decrease the flow rate of DEF through DEF delivery line 151.

The control system 114 includes the controller 112. Controller 112 may be configured as a microcomputer including a microprocessor unit, input/output ports, read-only memory, random access memory, keep alive memory, a controller area network (CAN) bus, etc. Controller 112 may be configured as a powertrain control module (PCM) in some examples. The controller may receive input data from the various sensors 116, process the input data, and trigger the actuators 181 in response to the processed input data based on instruction or code programmed therein corresponding to one or more routines.

It will be appreciated that other components may be included in the engine such as additional valves, sensors, and actuators. In some embodiments, wherein engine system 106 is a boosted engine system, the engine system may further include a boosting device, such as a turbocharger (not shown).

Figure 8:
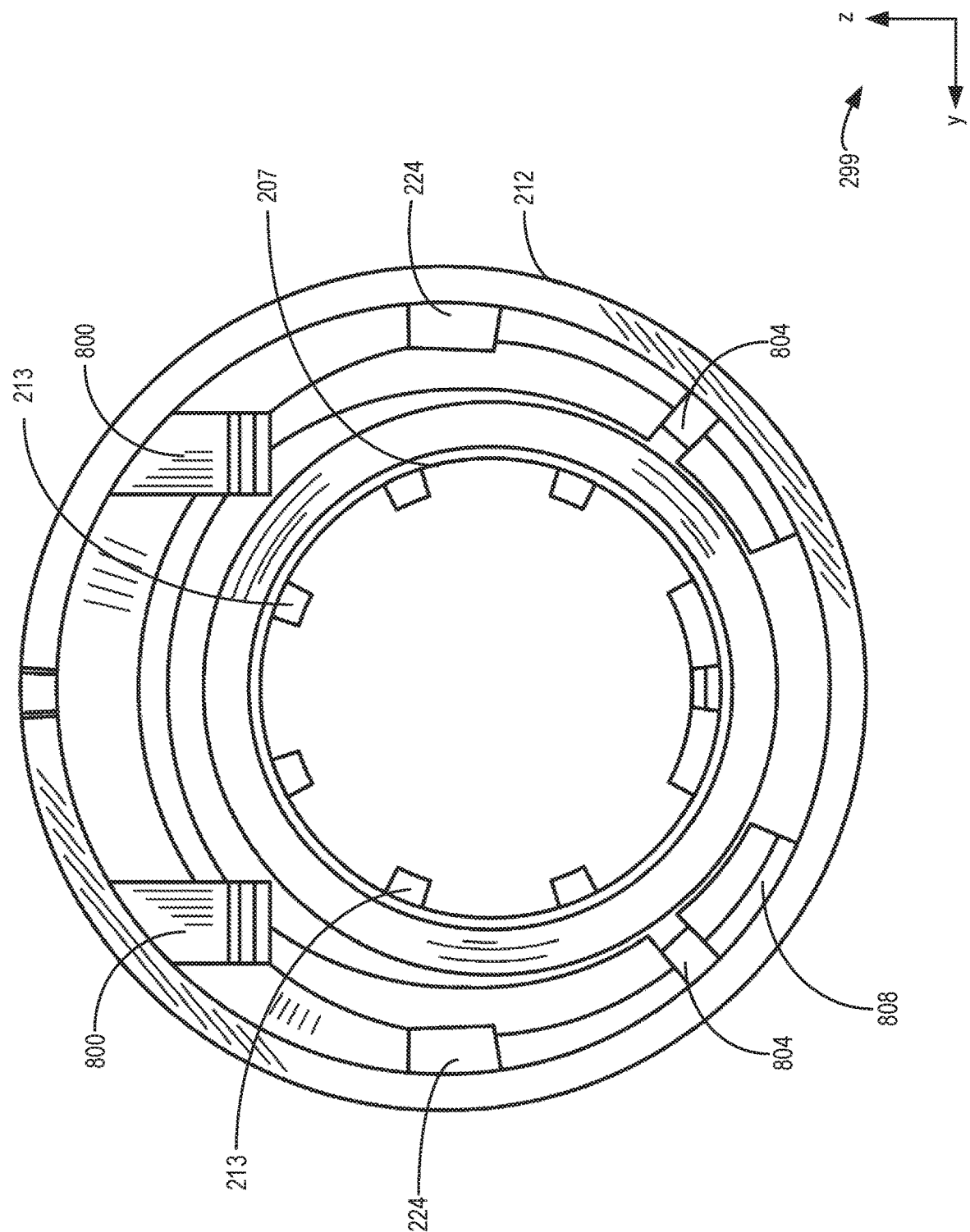
FIG. 8 shows an interior view of a casing of the refill adapter.
Figure 9A:
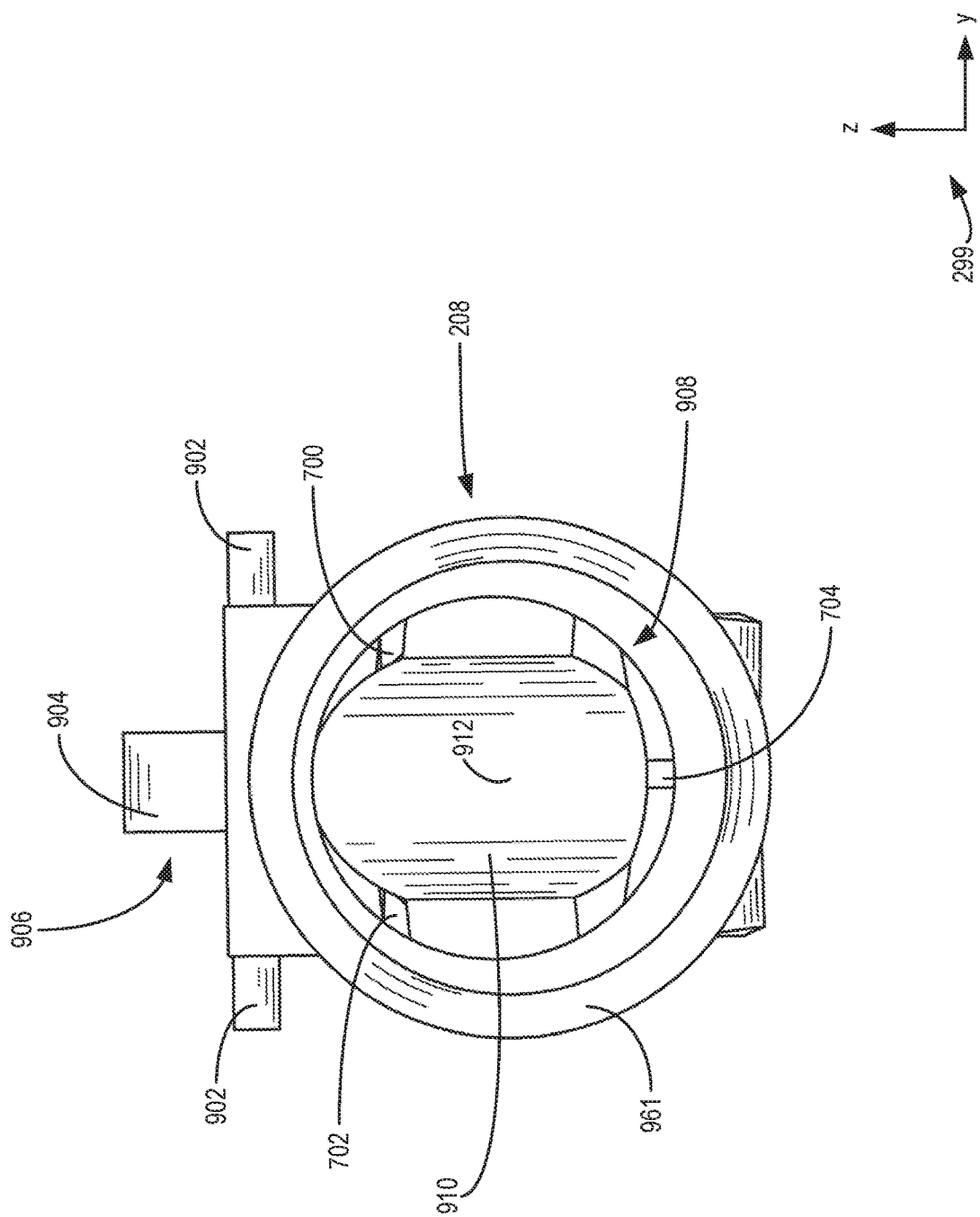
FIG. 9A shows a front view of a pivotable door of the refill adapter, with the pivotable door removed from a body of the refill adapter.
Figure 9B:
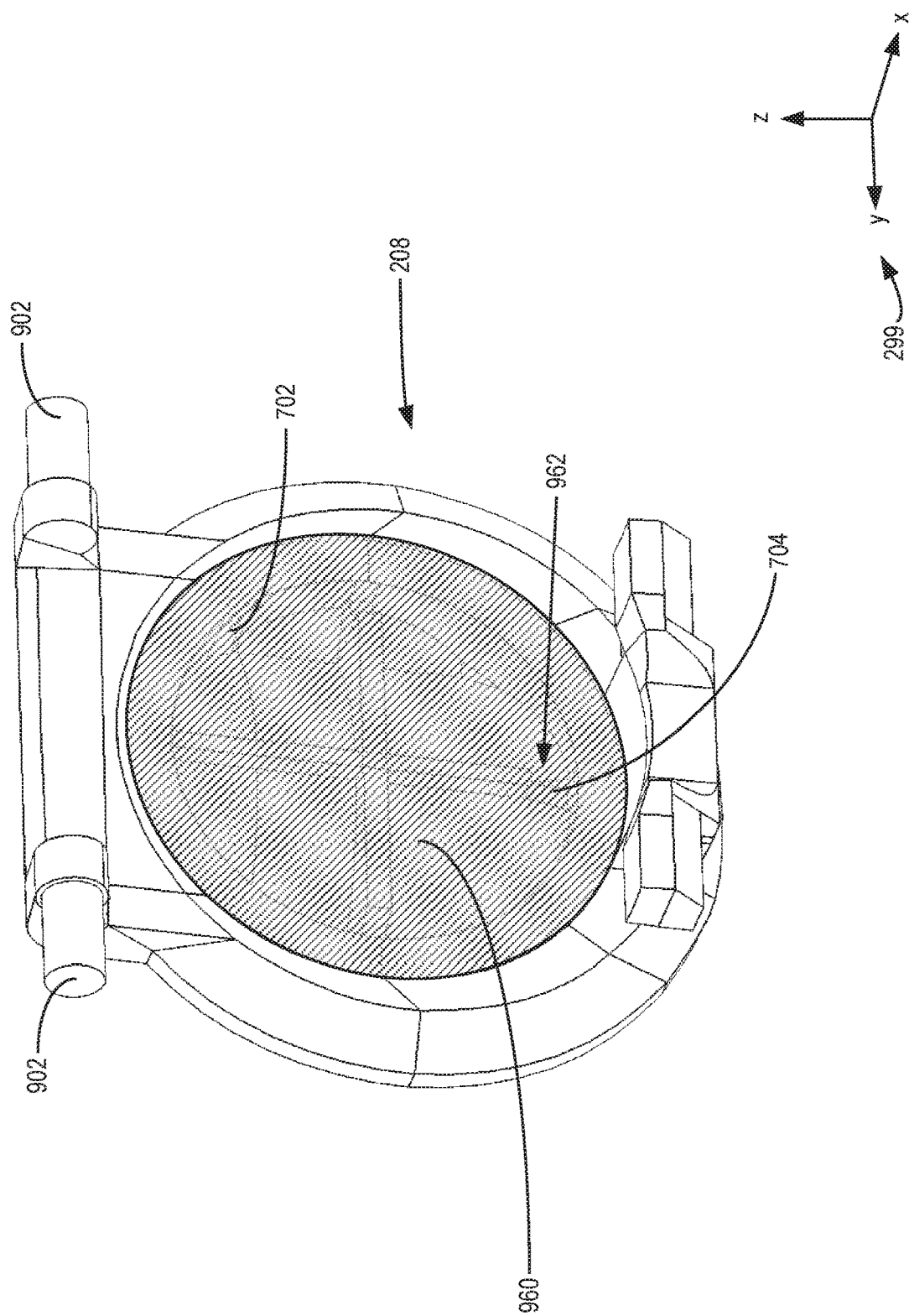
FIG. 9B shows a rear view of the pivotable door of the refill adapter and depicts a sealing membrane coupled to the pivotable door.
Figure 10:
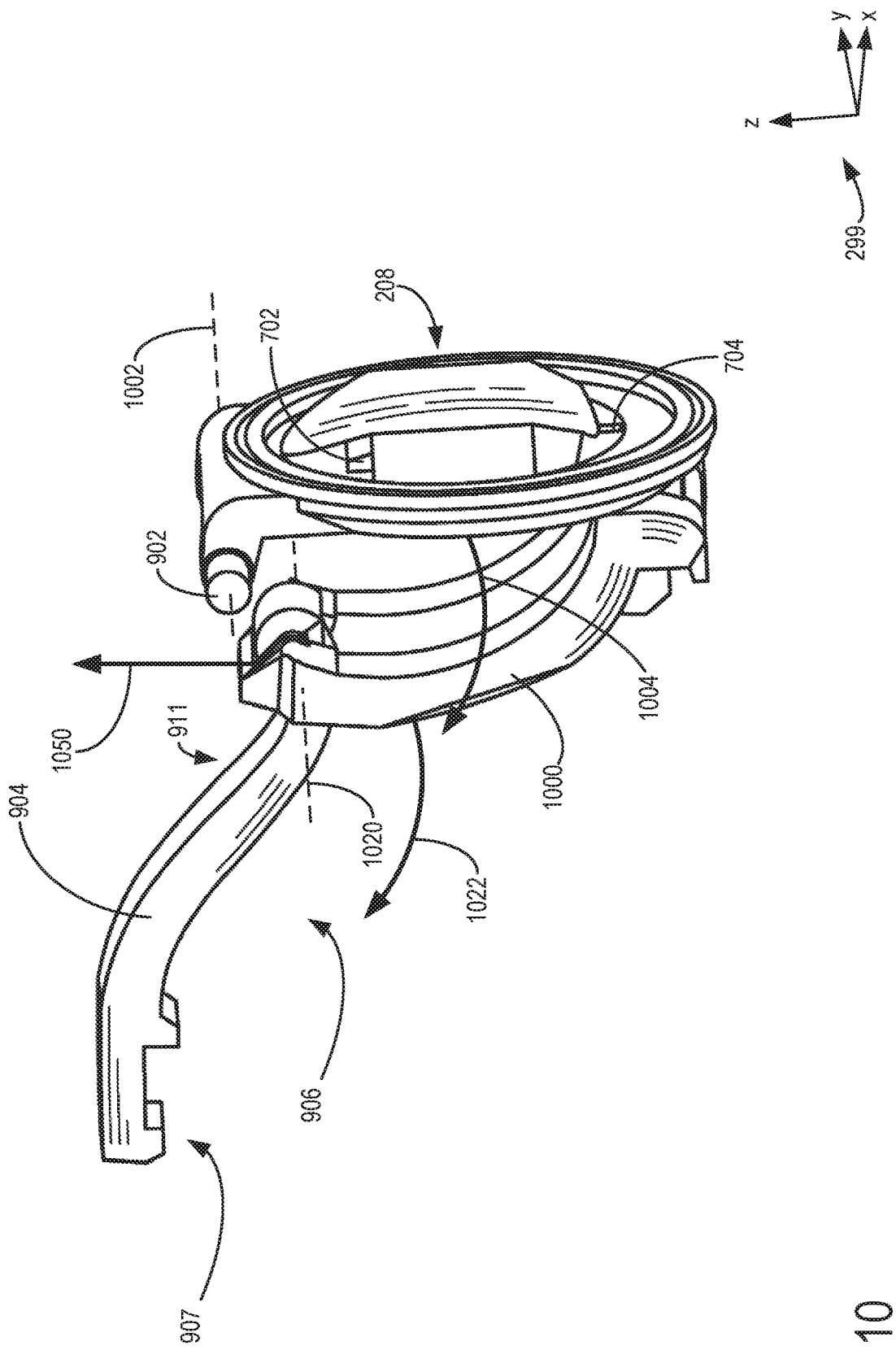
FIG. 10 shows a side perspective view of the pivotable door, with the pivotable door removed from the refill adapter.
Figure 11:
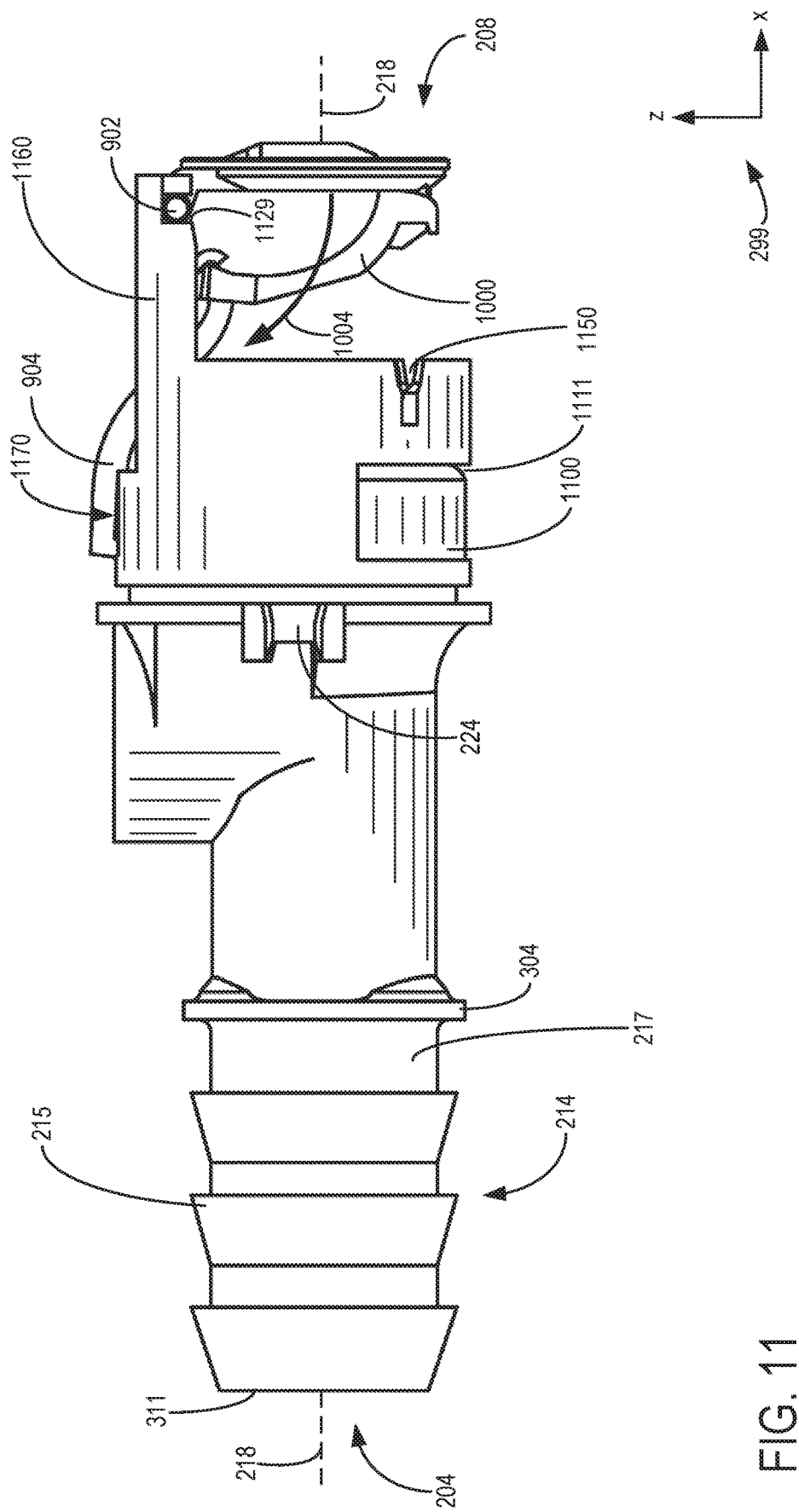
FIG. 11 shows a side view of the refill adapter with the casing removed from the body.
Figure 12A:
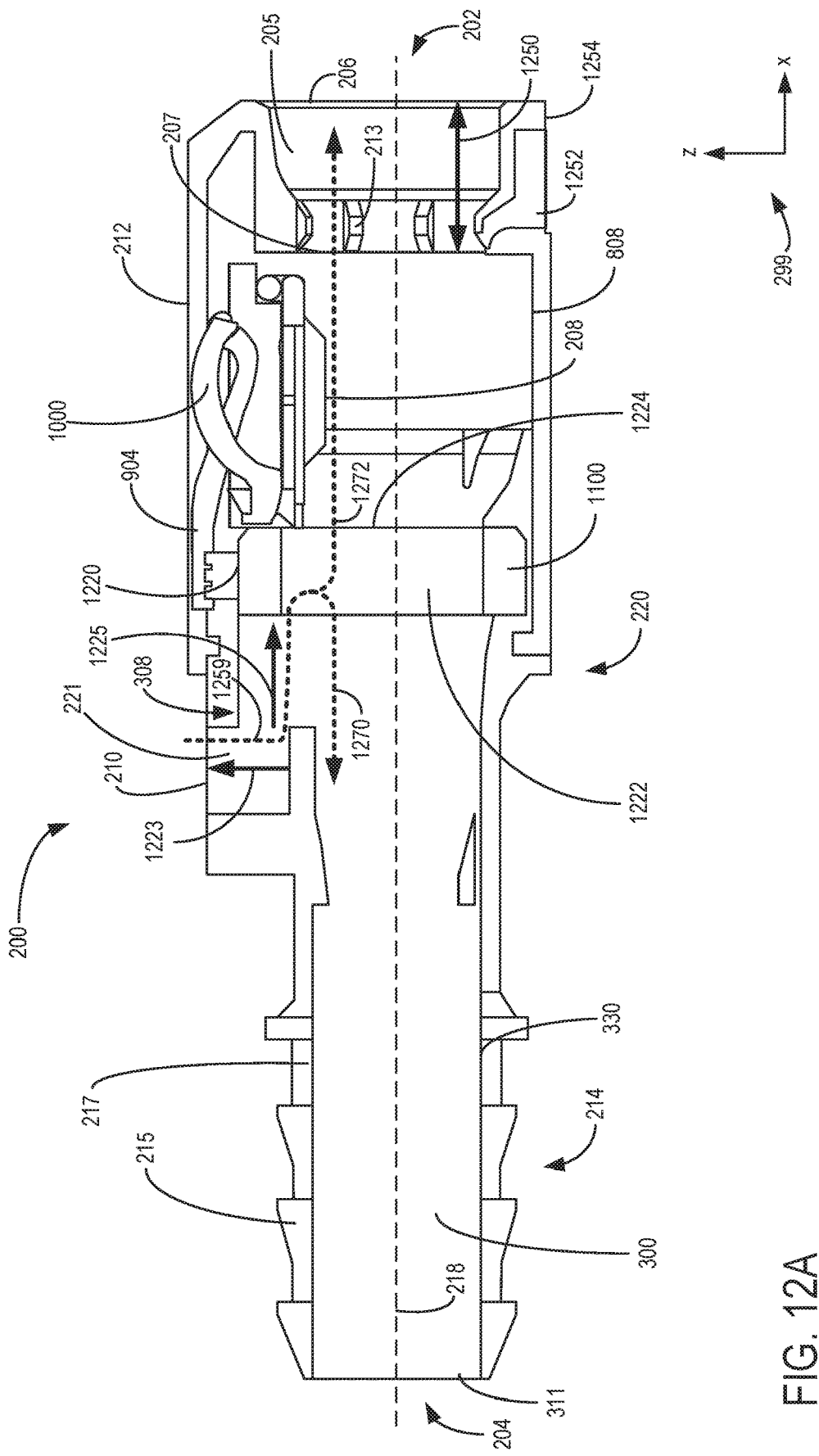
FIG. 12A shows a first cross-sectional view of the refill adapter with the pivotable door in an opened position.
Figure 12B:
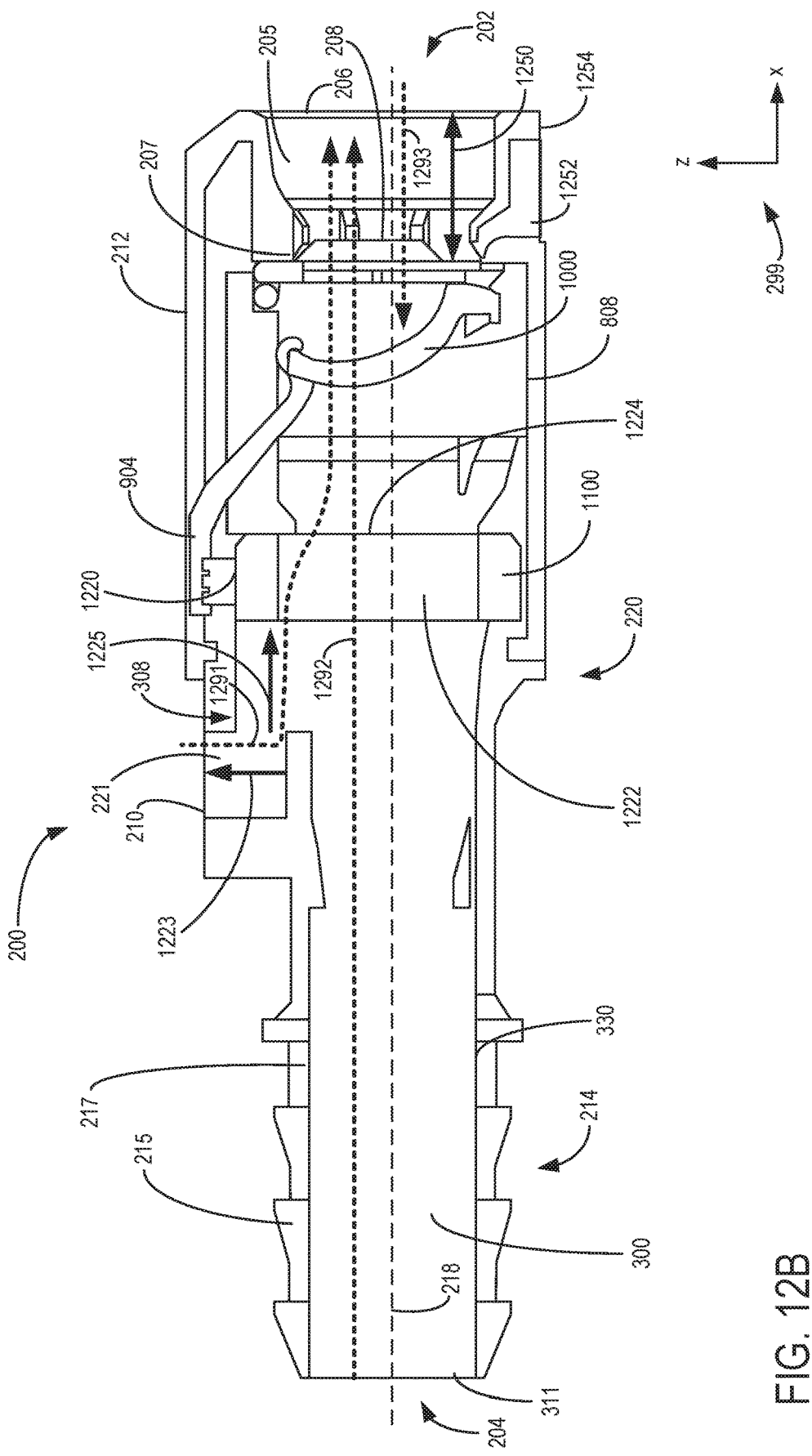
FIG. 12B shows a second cross-sectional view of the refill adapter with the pivotable door in a closed position.
Figure 13:
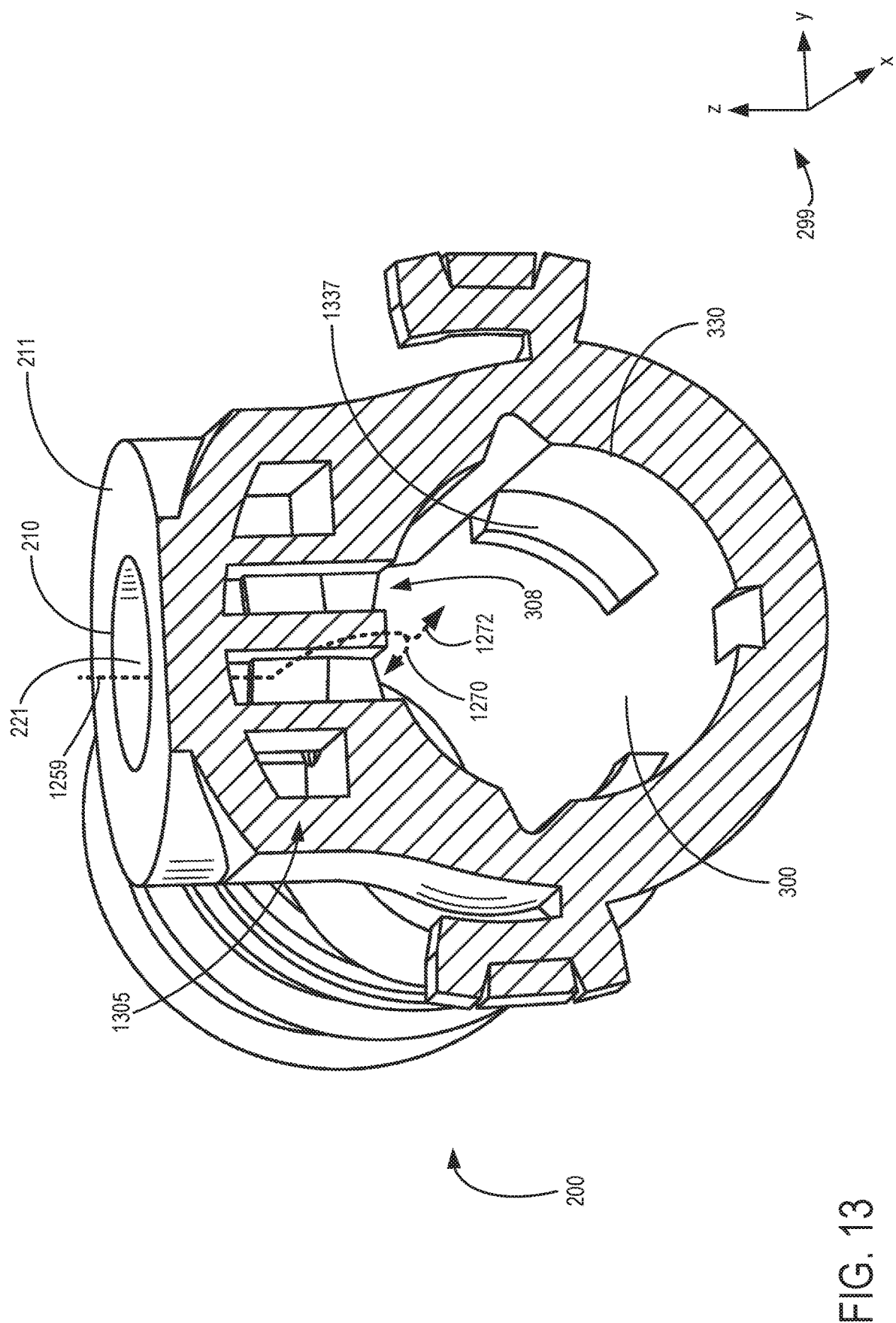
FIG. 13 shows a third cross-sectional view of the refill adapter.

FIGS. 2-13 each show an embodiment of a refill adapter 200 and its components from different views. For example, FIGS. 2-7 show various views of an exterior of the refill adapter, FIG. 8 shows an interior view of a cover of the refill adapter, FIGS. 9A-9B and FIG. 10 show a pivotable door of the refill adapter coupled to a biasing member, FIG. 11 shows a side view of the refill adapter with the cover removed, FIG. 12A shows a first cross-sectional side view of the refill adapter, FIG. 12B shows a second cross-sectional side view of the refill adapter, and FIG. 13 shows a cross-sectional perspective view of the refill adapter. Reference axes 299 are included by each of the FIGS. 2-13 for comparison of the various views shown. Although the embodiment of the refill adapter 200 shown by FIGS. 2-13 is described below as an adapter suitable for inclusion within a DEF system (e.g., the DEF system described above with reference to FIG. 1), alternate embodiments of the refill adapter may be sized and/or shaped for utilization with different types of systems (e.g., engine coolant systems, windshield washer fluid systems, etc.).

Turning firstly to FIGS. 2-7, the refill adapter 200 is shown in various perspective and side views. The refill adapter 200 includes a body 220 having a first end 204 shaped to couple with an external fluid passage (e.g., the DEF delivery line 151 shown by FIG. 1 and described above) configured to flow fluid to a fluid reservoir (e.g., the DEF tank 153 shown by FIG. 1 and described above). The body 220 additionally includes a second end 202 including an aperture 207 (which may be referred to herein as an opening or exterior opening) shaped to receive a nozzle (e.g., the nozzle 173 shown by FIG. 1 and described above). The body 220 of the refill adapter 200 is formed of a material that is non-reactive with fluids flowing from the nozzle. For example, the body 220 may be formed of a polymer material (e.g., PVC, polypropylene homopolymer, etc.) that is non-reactive with DEF (e.g., inert to contact with DEF).

In the example described below with reference to FIGS. 2-13, the first end 204 of the refill adapter 200 includes a plurality of barbs 215 positioned along an exterior surface 217 of the body 220. Barbs 215 extend in a direction away from a central axis 218 of the body 220 and taper toward the exterior surface 217 in a direction of the first end 204. The barbs 215 may retain a position of the refill adapter 200 relative to the external fluid passage when the first end 204 is inserted into the external fluid passage. For example, the external fluid passage may be formed of an elastic material (e.g., flexible PVC, rubber, etc.) and may have an inner diameter less than an outer diameter 419 of each of the barbs 215. Each of the barbs 215 may press against an inner surface of the external fluid passage when the first end 204 of the refill adapter 200 is inserted into the external fluid passage, thereby deforming a shape of the external fluid passage and locking the first end 204 of the refill adapter 200 into the external fluid passage. In other examples, the refill adapter 200 may include a different number of barbs (e.g., four, five, etc.) and/or barbs having a different shape, relative arrangement, etc.

The body 220 additionally includes a stop ring 304 formed by the exterior surface 217 and positioned away from the first end 204 and the barbs 215. Stop ring 304 may further retain a position of the refill adapter 200 relative to the external fluid passage when the first end 204 is coupled to the external fluid passage. For example, stop ring 304 may extend away from the body 220 in a radial direction relative to the central axis 218 such that a diameter 421 of the stop ring 304 is greater than the outer diameter 419 of the barbs 215 and greater than an outer diameter of the external fluid passage. In this configuration, the stop ring 304 may prevent the external fluid passage from surrounding the body 220 at locations beyond the stop ring 304 in a direction from the first end 204 to the second end 202.

An interior of the body 220 forms a fluid passage 300 (which may be referred to herein as a flow passage, DEF flow passage, or adapter flow passage, and as shown by FIGS. 12A-12B and FIG. 13), with the fluid passage 300 extending through the refill adapter 200 from an opening 311 positioned at the first end 204 to the aperture 207 along a central axis 218 of the body 220 of the refill adapter 200. The fluid passage 300 is formed by an inner surface 330 of the refill adapter 200 and fluidly couples the opening 311 with the aperture 207 such that fluid (e.g., DEF) may flow through the refill adapter 200 in a direction from the aperture 207 to the opening 311 (e.g., from the second end 202 to the first end 204). In the embodiment described herein with reference to FIGS. 2-13, the fluid passage 300 is sized such that a diameter 340 of the opening 311 is a same amount of length as a diameter 730 of the aperture 207. By configuring the diameter 340 and the diameter 730 to be a same amount of length, an overall size (e.g., diameter) of the refill adapter 200 may be reduced (e.g., relative to adapters which include openings having different diameters).

The second end 202 of the body 220 forms a nozzle insertion passage 205 extending in a direction away from the pivotable door 208 and the first end 204, with the nozzle insertion passage 205 being in fluidic communication with atmosphere via an opening 206 (e.g., opened at one side by opening 206 and sealed by the pivotable door 208 at the opposite side). The opening 206 and nozzle insertion passage 205 may each prevent different nozzles (e.g., nozzles different than a DEF nozzle, such as the nozzle 173 described above with reference to FIG. 1) from being inserted into the aperture 207 and fluid passage 300 as described below.

In one example, the diameter 730 (e.g., passage diameter) of the opening 206 may be slightly greater than a diameter of a DEF nozzle (e.g., nozzle 173) and slightly less than a diameter of a different type of nozzle (e.g., diesel fuel nozzle) such that nozzles having a diameter greater than the diameter 730 of the opening 206 may not be inserted into the nozzle insertion passage 205. For example, diesel nozzles having a diameter of 23.8 millimeters may be prevented from being inserted into the nozzle insertion passage 205. In another example, some nozzles such as nozzles of fuel additive bottles may be shaped with a nozzle diameter that is less than the diameter 730 of the opening 206 and may include a shoulder (e.g., a radial protrusion around an outer perimeter of the nozzle) with a diameter greater than the diameter 730 of the opening 206. In such examples, the diameter of the fuel additive bottle nozzle is small enough to be inserted into opening 206 and the nozzle insertion passage 205. However, a length from a nozzle opening (e.g., an opening of the nozzle through which fluid is dispensed) of the fuel additive bottle to a shoulder of the fuel additive bottle may be less than a length 1250 (e.g., passage length) of the nozzle insertion passage 205 in a direction parallel with the central axis 218 (e.g., between the opening 206 and the aperture 207).

During conditions in which a user attempts to insert a fuel additive bottle nozzle into the refill adapter 200, the shoulder of the nozzle is prevented from being inserted into the nozzle insertion passage 205 due to the increased diameter of the shoulder relative to the diameter 730 of the opening 206. Because the length between the nozzle opening and the shoulder is less than the length 1250 of the nozzle insertion passage 205, and because an amount of insertion of the nozzle into the nozzle insertion passage 205 is limited by a position of the shoulder relative to the nozzle opening, the nozzle is prevented from pressing against the pivotable door 208 and being inserted into the fluid passage 300.

The nozzle insertion passage 205 additionally includes a plurality of protrusions 213 formed by the nozzle insertion passage 205 along a perimeter of the nozzle insertion passage 205. The protrusions 213 extend in a radial direction toward the central axis 218 of the body 220. In some examples, the protrusions 213 may retain a position of a nozzle relative to the refill adapter 200 (e.g., within the nozzle insertion passage 205) when the nozzle is inserted through the aperture 207 and into the fluid passage 300 and/or may prevent nozzles having a diameter slightly smaller than the diameter 730 of the opening 206 (e.g., gasoline nozzles) from pressing against the pivotable door 208 when inserted into the nozzle insertion passage 305. For example, the nozzle may include one or more flexible ribbed surfaces surrounding a perimeter of the nozzle. During conditions in which the nozzle is inserted into the refill adapter 200, the protrusions 213 may lock into gaps formed between the ribbed surfaces of the nozzle in order to increase an amount of force required to remove the nozzle from the refill adapter 200. In another example, a distance 750 between opposing protrusions 213 (e.g., protrusions 213 positioned opposite to each other in a radial direction relative to the central axis 218) may be less than a diameter of some nozzles such as gasoline nozzles. A gasoline nozzle may have a diameter smaller than the diameter 730 of the opening 206 and larger than the distance 750. During conditions in which the gasoline nozzle is inserted through the opening 206 and into the nozzle insertion passage 305, the gasoline nozzle may be prevented from pressing against the pivotable door 208 and instead may press against the protrusions 213 due to the distance 750 being less than the diameter of the gasoline nozzle. As a result, the gasoline nozzle is prevented from being inserted into the fluid passage 300.

Additionally, the refill adapter 200 includes a drain port 1252 extending between the nozzle insertion passage 205 and an exterior surface 1254 of the second portion 212. During conditions in which a nozzle is prevented from pressing against the pivotable door 208 (e.g., such as during the conditions described above), the drain port 1252 may flow fluid from the nozzle insertion passage 305 (e.g., fluid dispensed from the nozzle) to a location external to the refill adapter 200 (e.g., to atmosphere). In this way, nozzles that are configured to dispense a fluid (e.g., gasoline, diesel fuel, etc.) that is different from a fluid stored within a fluid reservoir coupled with the refill adapter 200 (e.g., DEF tank 153 described above with reference to FIG. 1) are unable to dispense fluid into the fluid passage 300 of the refill adapter 200.

The embodiment of the refill adapter 200 described herein with reference to FIGS. 2-13 does not include additional caps (e.g., removable threaded caps) configured to seal the nozzle insertion passage 205 and/or fluid passage 300. Because one side of the nozzle insertion passage 205 is sealed by the pivotable door 208 and the opposite side is open to the atmosphere (e.g., forms an open hole in the body 220), a nozzle may be inserted directly into the nozzle insertion passage 205 without removal of caps, plugs, etc. from the refill adapter 200.

In the embodiment shown by FIGS. 2-13, the body 220 includes a first portion 214 and a second portion 212 (which may be referred to herein as a cover). The second portion 212 is removably coupled to the first portion 214 and partially surrounds the first portion 214. The first portion 214 forms the first end 204 of the body 220 and the second portion 212 forms the second end 202 of the body 220. The first portion 214 includes a plurality of slots 306 (e.g., grooves). Each slot 306 is shaped to receive a corresponding tab 224 formed by the second portion 212. Each tab 224 is inserted into its corresponding slot 306 and engages with its corresponding slot 306 during conditions in which the second portion 212 is coupled to the first portion 214 in order to lock the position of the second portion 212 relative to the first portion 214. In some examples, an angle between each of the slots 306 relative to the central axis 218 may be less than 180 degrees such that the second portion 212 may only couple to the first portion 214 during conditions in which the first portion 214 and second portion 212 are in a particular alignment relative to each other (e.g., an arrangement in which the aperture 207 aligns with the pivotable door 208). In other examples, the first portion 214 may include a different number of slots (e.g., three, four, etc.) and the second portion 212 may include a corresponding number and arrangement of tabs. In alternate embodiments, the first portion 214 and second portion 212 may be formed together as a single piece (e.g., molded together, fused, welded, etc.).

FIG. 8 shows an interior view of the second portion 212 of the body 220 of the refill adapter 200. In the view shown by FIG. 8, the second portion 212 is removed from the refill adapter 200 in order to illustrate features within an interior of the second portion 212. As described above, the second portion 212 is removable from the first portion 214 via disengagement of the tabs 224 from the corresponding slots 306 of the first portion 214. The plurality of protrusions 213 are shown positioned around the perimeter of the nozzle insertion passage 205 (shown by FIG. 2), proximate to the aperture 207 and extending in a radial direction toward the central axis 218 of the body 220.

The second portion 212 additionally includes various features formed by an inner surface 808 of the second portion 212 configured to retain a position of the second portion 212 relative to the first portion 214. For example, second portion 212 is shown to include a plurality of rails 804, with each of the rails 804 shaped to fit within corresponding grooves 1150 (shown by FIG. 11) of the first portion 214. The second portion 212 additionally includes a plurality of hanging arms 800, with each of the hanging arms 800 shaped to couple with corresponding extensions 1160 (shown by FIG. 11) of the first portion 214. The hanging arms 800 may additionally retain a position of the pivotable door 208 within the refill adapter 200 in order to enable the pivotable door 208 to pivot relative to the body 220.

FIGS. 9A-9B and FIG. 10 show different views of the pivotable door 208 and a biasing member 906 coupled to the pivotable door 208, with the pivotable door 208 and biasing member 906 removed from the refill adapter 200. Pivotable door 208 is pivotable along pivot axis 1002 in a direction indicated by arrow 1004. Pivotable door 208 is configured to seal the aperture 207 and form an external surface of the refill adapter 200 (as described above with reference to FIG. 2 and FIGS. 7-8). The pivotable door 208 may include an annular seal 961 shaped to form a barrier to fluids around the aperture 207 within the body 220 of the refill adapter 200, with the annular seal 961 being formed of a material such as a thermoplastic elastomer. In some examples, a portion or entirety of the pivotable door 208 may be formed of a material permeable to DEF vapors (e.g., polytetrafluoroethylene fabric). In other examples (such as that shown by FIGS. 2-13 and in particular, FIG. 9B), the pivotable door 208 may be formed of a different material (e.g., nylon, polypropylene, etc.) and is coupled to a permeable membrane 960 formed of a material permeable to DEF vapors. The permeable membrane 960 may be positioned downstream of a plurality of venting channels formed by the pivotable door 208 relative to a flow direction of fluid (e.g., DEF) into the refill adapter 200 via a nozzle (e.g., nozzle 173 shown by FIG. 1 and described above). The permeable membrane 960 may surround an end 962 of each of the venting channels in order to enable vapor to flow through the venting channels in a direction from an interior of the refill adapter (e.g., from the fluid passage 300) to a location external to the refill adapter 200 (e.g., to the atmosphere) and to not enable liquid to flow through the venting channels. In the embodiment shown by FIGS. 2-13, the pivotable door 208 includes a first venting channel 700, a second venting channel 702, and a third venting channel 704 positioned radially relative to the central axis 218 during conditions in which the pivotable door 208 is in a fully closed position relative to the aperture 207. Venting channels 700, 702, and 704 may be formed by one or more surfaces of the pivotable door 208 and may extend through the pivotable door 208 in order to fluidly couple the interior of the refill adapter 200 to the atmosphere. Vapor (e.g., DEF vapor) may flow through the fluid passage 300 of the refill adapter 200, through the permeable membrane 960, and through the venting channels 700, 702, and/or 704 towards the atmosphere. In alternate embodiments, the pivotable door may include a different amount, size, and/or relative arrangement of venting channels.

The pivotable door 208 includes a protruding portion 908 extending in a direction away from the aperture 207 and into the nozzle insertion passage 205. In one example, a diameter of the protruding portion 908 may be less than an inner diameter of a nozzle shaped to fit within the nozzle insertion passage 205. The protruding portion 908 includes a groove 910 shaped to guide the DEF nozzle toward a midpoint 912 of the pivotable door 208. For example, a nozzle inserted into the nozzle insertion passage 205 may be pressed against the protruding portion 908. As the nozzle is pressed against the protruding portion 908, the groove 910 may cause the nozzle to slide in a radial direction relative to the central axis 218 until a center of the nozzle (e.g., a midpoint of a main opening of the nozzle) is aligned with the midpoint 912 of the pivotable door 208. Aligning the center of the nozzle with the midpoint 912 of the pivotable door 208 via the protruding portion 908 may decrease an amount of force required to pivot the pivotable door 208, thereby increasing a user friendliness of the refill adapter 200.

The pivotable door 208 is positioned within the fluid passage 300 and is biased against the aperture 207 by the biasing member 906. The biasing member 906 includes a first section 1000 and a second section 904, with the first section 1000 being coupled to the pivotable door 208 and the second section 904 including a hooked portion 907 coupled with a slot 1170 (as indicated by FIG. 11) formed by upper surface 1220 of the first portion 214 (e.g., a surface forming the perimeter of the fluid passage 300). The pivotable door 208 includes hinge arms 902 shaped to couple with grooves 1129 (shown by FIG. 11) formed by the first portion 214 of the body 220. Pivot axis 1002 extends through each of the hinge arms 902 and the grooves 1129. The pivotable door 208 may be pivoted from a fully closed position to a plurality of opened positions. In the fully closed position, pivotable door 208 closes the aperture 207 of the refill adapter 200 such that liquid may not flow through the aperture 207 and into the refill adapter 200, or through the refill adapter 200 (e.g., fluid passage 300) and out of the refill adapter 200 via aperture 207.

As the pivotable door 208 is pivoted around the pivot axis 1002 in the direction indicated by arrow 1004 (e.g., by pressing a nozzle against the pivotable door 208 as described above), the first section 1000 presses against the second section 904 and urges the second section 904 in a direction indicated by arrow 1050. Additionally, as the pivotable door 208 is pivoted around the pivot axis 1002, the first section 1000 of the biasing member 906 pivots relative to the second section 904 around pivot axis 1020 in a direction indicated by arrow 1022. As the first section 1000 presses against the second section 904 and urges the second section 904 in the direction indicated by arrow 1050, an end 911 of the second section 904 may be moved in the direction indicated by arrow 1050. As a result, the pivot axis 1020 is also moved in the direction indicated by arrow 1050 by a same amount.

However, because the hooked portion 907 of the second section 904 is coupled to the slot 1170, the hooked portion 907 of the second section 904 does not move in response to pressing the first section 1000 against the second section 904. Instead, the second section 904 is compressed in the direction indicated by arrow 1050. In one example, the second section 904 is compressed in this way during conditions in which the pivotable door 208 is moved from the fully closed position to one of the plurality of opened positions. During conditions in which the first section 1000 does not press against the second section 904 (e.g., when the nozzle does not press against the pivotable door 208), the second section 904 may expand from its compressed condition and press the first section 1000 in a direction opposite to the direction indicated by arrow 1050. For example, the second section 904 may press against the first section 1000 to pivot the pivotable door 208 towards the fully closed position from one of the plurality of opened positions.

The biasing member 906 may be formed of a polymer material that is not chemically reactive with DEF (e.g., a material that is inert in the presence of DEF, such as nylon or polypropylene). In the example of the refill adapter 200 described herein with reference to FIGS. 2-13, the biasing member 906 may press the pivotable door 208 against the aperture 207 with a different amount of force in response to a position of the pivotable door 208 relative to the aperture 207. For example, during conditions in which the pivotable door 208 is in the fully closed position, the biasing member 906 may press the pivotable door 208 against the aperture 207 with a greater amount of force than during conditions in which the pivotable door 208 is in a partially opened or fully opened position relative to the aperture 207. In this way, an initial amount of force required to pivot the pivotable door 208 from the fully closed position away from the aperture 207 is greater than an amount of force required to retain the pivotable door 208 in one of the plurality of opened positions, thereby increasing an ease with which a position of a nozzle inserted into the refill adapter 200 may be retained. In alternate embodiments, the biasing member may have a different configuration (e.g., size and/or arrangement of components such as first section 1000 and second section 904) resulting in a different amount of force required to pivot the pivotable door 208 from the fully closed position and/or a different amount of force required to retain the pivotable door 208 in one of the plurality of opened positions.

FIG. 11 shows a side view of the refill adapter 200 with the second portion 212 removed. A ring 1100 (which may be referred to herein as a magnetized ring, magnetic ring, and/or annular magnet) is shown positioned within the body 220 and downstream of the pivotable door 208 relative to a direction of fluid flow through the refill adapter 200 (e.g., between the first end 204 and second end 202). The magnetic ring 1100 is positioned upstream of the main ventilation passage 221 and the plurality of secondary ventilation passages 308 relative to a direction of fluid flow (e.g., DEF flow) from the nozzle (e.g., DEF nozzle) through the refill adapter 200.

The first portion 214 of the body 220 includes a slot 1111 shaped to receive the magnetic ring 1100. The magnetic ring 1100 is retained in face-sharing contact with the slot 1111 by the second portion 212 of the body 220 when the second portion 212 is coupled to the body 220. The magnetic ring 1100 is positioned around a perimeter of the fluid passage 300, with an inner surface 1222 of the magnetic ring 1100 (shown by FIGS. 12A-12B) forming a section of the fluid passage 300. The magnetic ring 1100 is positioned in face-sharing contact with the inner surface 330 of the fluid passage 300 between the pivotable door 208 and the opening 311.

In some examples, the magnetic ring 1100 may be formed of a magnetic metal (e.g., iron, iron alloy, or other type of metal) in order to produce a permanent magnetic field within an opening 1224 formed by the inner surface 330 (shown by FIGS. 12A-12B). In some examples, a nozzle inserted into the fluid passage 300 of the refill adapter 200 via the nozzle insertion passage 205 and aperture 207 (e.g., by pivoting pivotable door 208) may include one or more valves that are actuatable by interacting with the magnetic field produced by the magnetic ring 1100. For example, a nozzle may include a valve configured to be in a normally closed position such that fluid does not flow from the nozzle during conditions in which the valve is closed. However, during conditions in which the nozzle is inserted into the fluid passage 300 and through the magnetic ring 1100, the magnetic field may interact with the valve (e.g., exert a force on one or more components of the valve) in order to move the valve from the closed position to an opened position. Fluid may then flow from the nozzle while the valve is in the opened position. Removal of the nozzle from the refill adapter 200 may result in the valve returning to the closed position so that fluid no longer flows from the nozzle. In some examples, the nozzle may include a sensor configured to detect the magnetic field produced by the magnetic ring 1100 and to transmit electrical signals to an actuator of the valve in order to move the valve to the opened position during conditions in which the magnetic field is detected and to move the valve to the closed position during conditions in which the magnetic field is not detected. In other examples, the ring 1100 may be formed of a non-magnetic material (e.g., polypropylene).

By configuring the magnetic ring 1100 to couple with the slot 1111 downstream of the pivotable door 208, a length 490 (shown by FIG. 4) of the refill adapter 200 (e.g., a length from the first end 204 to the second end 202) may be reduced relative to adapters that include a magnetic ring positioned upstream of a pivotable door. By utilizing the inner surface 1222 of the magnetic ring 1100 as a section of the fluid passage 300 during conditions in which the magnetic ring 1100 is coupled with the slot 1111 within the refill adapter 200, a diameter 491 of the refill adapter 200 (e.g., a length in a direction perpendicular to the length 490) may be reduced, thereby enabling the refill adapter 200 to be installed in locations having a reduced amount of space and/or maneuverability. Additionally, by coupling the magnetic ring 1100 with slot 1111, the magnetic ring 1100 may be removed from the refill adapter 200 during conditions in which the second portion 212 is decoupled from the first portion 214 (e.g., during maintenance and/or cleaning of the refill adapter 200) in order to clean and/or replace the magnetic ring 1100.

FIGS. 12A-12B and FIG. 13 each show different cross-sectional views of the refill adapter 200. FIG. 12A shows a side view of the refill adapter 200 with the pivotable door 208 in an opened position, FIG. 12B shows a side view of the refill adapter 200 with the pivotable door 208 in a closed position, and FIG. 13 shows a view along central axis 218. FIG. 13 further illustrates the example flow paths of vapor through the refill adapter 200 shown by FIG. 12A (e.g., during conditions in which the pivotable door 208 is in the opened position). The main ventilation passage 221 is shown formed by the body 220 between the first end 204 and the second end 202. The main ventilation passage 221 extends in a radial direction 1223 relative to the central axis 218 of the body 220. The main ventilation passage 221 extends away from the fluid passage 300 and is fluidly coupled to (e.g., forms) the vent aperture 210 at an outer surface 211 of the refill adapter 200. As described above, the main ventilation passage 221 is fluidly coupled to the fluid passage 300 by the plurality of secondary ventilation passages 308 extending in a direction 1225 parallel to the central axis 218 (e.g., an axial direction relative to the central axis 218). The secondary ventilation passages 308 are separated from each other by surfaces of the body 220 such that the secondary ventilation passages 308 form a grating 1305 (shown by FIG. 13). In some examples, the grating 1305 may reduce a likelihood of particulate matter (e.g., dust, dirt, etc.) from entering the refill adapter 200 via the vent aperture 210 and main ventilation passage 221.

The main ventilation passage 221 is fluidly coupled with the DEF storage reservoir (e.g., the DEF tank 153 shown by FIG. 1 and described above) via an external vapor passage (e.g., ventilation line 143 shown by FIG. 1 and described above) such that DEF vapor from the DEF storage reservoir may flow through the main ventilation passage 221 from the external vapor passage and into the fluid passage 300. The vapor may then flow out to atmosphere through the pivotable door 208 via the permeable membrane 960 and venting channels 700, 702, and/or 704.

An example of vapor flow through the refill adapter 200 during conditions in which the pivotable door 208 is in an opened position is shown by flow path 1259 of FIG. 12A. Flow path 1259 illustrates a flow of vapor into the main ventilation passage 221 (e.g., from the external vapor passage), through the secondary ventilation passages 308, and into the fluid passage 300. A first portion of the vapor (e.g., 5% of the vapor along flow path 1259) may recirculate back into the DEF storage reservoir by flowing out of the first end 204 of the refill adapter 200 (e.g., along return flow path 1270), and a second portion of the vapor (e.g., 95% of the vapor along flow path 1259) may flow out to atmosphere via the pivotable door 208 (e.g., along venting flow path 1272, as described in the example above).

An example of vapor flow through the refill adapter 200 during conditions in which the pivotable door 208 is in a closed position is shown by flow path 1291 and flow path 1292 of FIG. 12B. Flow path 1291 illustrates a flow of vapor into the main ventilation passage 221 (e.g., from the external vapor passage), through the secondary ventilation passages 308, and into the fluid passage 300. The vapor from the main ventilation passage 221 flows along the flow path 1291 to atmosphere through the pivotable door 208. Vapor may additionally flow from the DEF storage reservoir and out to atmosphere along the flow path 1292 (e.g., through the fluid passage 300 via the first end 204 and not through the main ventilation passage 221). As vapor flows out of the DEF storage reservoir via the refill adapter 200 as described above, atmospheric air may flow into the refill adapter 200 via the pivotable door 208 as indicated by airflow path 1293.

By positioning the secondary ventilation passages 308 to extend in an axial direction relative to the central axis 218, a length of the main ventilation passage 221 may be reduced and the diameter 491 of the refill adapter 200 may be reduced. Additionally, a likelihood of liquid (e.g., liquid dispensed by a nozzle and/or liquid from the reservoir fluidly coupled to the refill adapter, such as DEF tank 153 described above) flowing out of the refill adapter 200 via the main ventilation passage 221 and secondary ventilation passages 308 may be reduced. In order to further reduce the likelihood of liquid flowing out of the refill adapter 200 via the main ventilation passage 221, the fluid passage 300 includes a plurality of protruding features 1337 positioned along the perimeter of the fluid passage 300 and extending in a radial direction relative to the central axis 218. The protruding features 1337 are shaped to prevent a nozzle inserted into the refill adapter 200 from extending further into the fluid passage 300 into locations downstream of the protruding features 1337 and to retain a position of the nozzle within the fluid passage 300. In one example, the protruding features 1337 may guide the nozzle into a position within the fluid passage 300 that reduces a likelihood of premature nozzle shut-off, aligns a valve within the nozzle with the magnetic field produced by magnetic ring 1100 in order to move the valve into the opened position (as described above), and/or reduces a likelihood of liquid dispensed from the nozzle from flowing out of the refill adapter 200 via the main ventilation passage 221.

Figure 14:
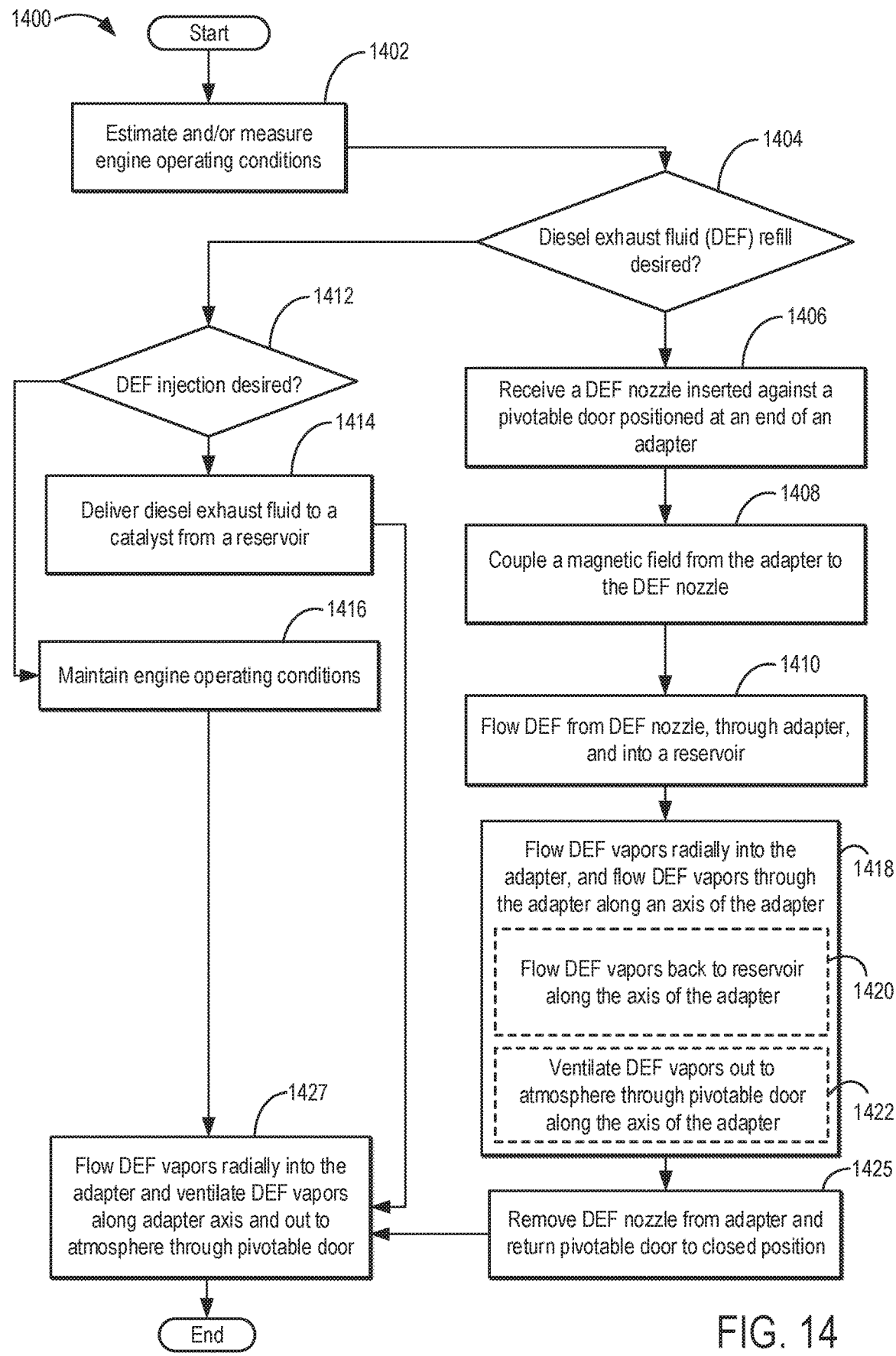
FIG. 14 shows a flowchart illustrating a method for a fluid refilling system.

FIG. 14 shows a flowchart illustrating a method 1400 of flowing liquid DEF and/or DEF vapors from a DEF system including a refill adapter to an engine system (e.g., DEF system 121 and engine system 106 shown by FIG. 1, and refill adapter 169 shown by FIG. 1 or refill adapter 200 shown by FIGS. 2-13 and described above). Although method 1400 is described below with reference to a DEF system, method 1400 may also apply to other types of fluid refilling systems (e.g., washer fluid refilling systems, engine coolant refilling systems, etc.).

At 1402, the method includes estimating and/or measuring engine operating conditions. Engine operating conditions may be estimated by a controller (e.g., controller 112 shown by FIG. 1 and described above) based on one or more outputs of various sensors in the engine system (e.g., such as various temperature sensors, pressure sensors, etc., as described above). Engine operating conditions may include engine speed and load, exhaust gas flow rate, mass air flow rate, coolant temperature, coolant flow rate, DEF injection rate, DEF level within a DEF tank (e.g., DEF tank 153 shown by FIG. 1 and described above), etc.

The method continues from 1402 to 1404 where the method includes determining whether a DEF refill is desired. In one example, the determination of whether a DEF refill is desired may be performed by the controller based on a measured output of a DEF level sensor positioned within the DEF tank (e.g., DEF level sensor 147 shown by FIG. 1 and described above). The controller may estimate and/or measure an amount of DEF stored in the reservoir based on the output of the DEF level sensor and may compare the amount of DEF stored in the reservoir to a threshold amount. In one example, the controller may receive electrical signals from the DEF level sensor and may make a logical determination regarding the amount of DEF stored in the reservoir based on logic rules that are a function of an amplitude, duration, and/or frequency of electrical signals received by the controller from the DEF level sensor. The controller may then generate a control signal that is sent to a graphical display device (e.g., an instrument panel) within a cabin of a vehicle including the DEF system, for example, in order to visually and/or audibly indicate the amount of DEF stored in the reservoir to an operator (e.g., user) of the vehicle, and/or indicate that a DEF refill is desired. In another example, the controller may compare an amplitude, duration, and/or frequency of signals from the DEF level sensor to values stored in a look-up table in non-transitory computer memory of the controller in order to estimate the amount of DEF stored within the reservoir. The controller may estimate amount of DEF stored within the reservoir based on a calculation using the look-up table with the input being the amplitude, duration, and/or frequency of signals from the DEF level sensor and the output being the amount of DEF stored within the reservoir, for example.

In one example, the threshold amount may be a predetermined amount that is less than a maximum DEF storage amount of the DEF tank. For example, the threshold amount may be an amount corresponding to 25% of the storage capacity (e.g., fluid storage volume) of the storage tank. In other examples, the threshold amount may be a different amount (e.g., 20% of the storage capacity, 30% of the storage capacity, etc.)

If a DEF refill is desired at 1404, the method continues to 1406 where the method includes receiving a DEF nozzle inserted against a pivotable door positioned at an end of an adapter. In one example, the pivotable door, adapter, and end of the adapter may be the pivotable door 208, refill adapter 200, and second end 202 described above with reference to FIGS. 2-13. The DEF nozzle may be inserted through an open-ended insertion passage of the adapter (e.g., nozzle insertion passage 205 fluidly coupled to the atmosphere via opening 206 as described above with reference to the refill adapter 200 of FIGS. 2-13) and may press against the pivotable door in order to pivot the door from a fully closed position to an opened position relative to an aperture sealed by the door (e.g., aperture 207 described above with reference to the refill adapter 200 shown by FIGS. 2-13). The DEF nozzle may then be inserted through the aperture and into a flow passage of the adapter (e.g., fluid passage 300 described above with reference to refill adapter 200 shown by FIGS. 2-13).

The method continues from 1404 to 1408 where the method includes coupling a magnetic field from the adapter to the DEF nozzle. In one example, coupling the magnetic field from the adapter to the DEF nozzle may include inserting the DEF nozzle through a magnetized ring (e.g., magnetic ring 1100 described above with reference to refill adapter 200 shown by FIGS. 2-13) coupled to the adapter and positioned within the adapter behind the pivotable door relative to an insertion direction of the DEF nozzle into the adapter. The magnetic field of the magnetized ring may interact with one or more actuators of a valve of the DEF nozzle (e.g., exert a force on one or more components of the valve) in order to move the valve from a fully closed position to an opened position. In some examples, the DEF nozzle may include a sensor configured to detect the magnetic field produced by the magnetic ring and may transmit electrical signals to an actuator of the valve in order to move the valve to the opened position during conditions in which the magnetic field is detected, and to move the valve to the closed position during conditions in which the magnetic field is not detected. In the closed position, DEF may not flow out of the DEF nozzle, and in the opened position, DEF may flow out of the DEF nozzle.

The method continues from 1408 to 1410 where the method includes flowing DEF from the DEF nozzle, through the adapter, and into the reservoir. Liquid DEF may flow from the DEF nozzle and through a flow passage of the adapter (e.g., fluid passage 300 described above with reference to refill adapter 200 shown by FIGS. 2-13) toward the reservoir. In some examples (e.g., during conditions in which the adapter is directly coupled to the reservoir), DEF may flow directly from the adapter and into an inlet of the reservoir (e.g., inlet 157 shown by FIG. 1 and described above). In other examples, DEF may flow from the adapter, into a flow passage coupled to the inlet of the reservoir (e.g., DEF flow passage 159 shown by FIG. 1 and described above), and into the reservoir.

The method continues from 1410 to 1418 where the method includes flowing DEF vapors radially into the adapter and through the adapter along an axis of the adapter. In some examples, flowing DEF vapors radially into the adapter and through the adapter along the axis may include flowing DEF vapors radially into the adapter through a main ventilation passage extending radially from the adapter axis, and then flowing the DEF vapors to the reservoir (e.g., DEF reservoir) along the axis of the adapter as indicated at 1420. In other examples, flowing DEF vapors radially into the adapter and ventilating DEF vapors along the axis may include flowing DEF vapors radially into the adapter through the main ventilation passage extending radially from the adapter axis, and then ventilating the DEF vapors out to atmosphere through the pivotable door along the axis of the adapter, as indicated at 1422. In yet other examples, the DEF vapors may both flow to the DEF reservoir along the axis of the adapter (e.g., at 1420) and ventilate to atmosphere through the pivotable door along the axis of the adapter (e.g., at 1422).

As one example of vapor flow at 1418, DEF vapors may flow from the reservoir and radially through the main ventilation passage of the adapter (e.g., along the example flow path 1259 shown by FIG. 12A and FIG. 13 and described above). As the vapors flows from the main ventilation passage toward the fluid passage, the vapors may flow through a plurality of secondary ventilation passages (e.g., secondary ventilation passages 308 described above with reference to refill adapter 200 shown by FIGS. 2-13) extending in a direction parallel to the adapter axis (e.g., central axis 218 of refill adapter 200). Vapors may then flow along the axis of the adapter back toward the reservoir at 1420 (e.g., along the example flow path 1270 shown by FIG. 12A and FIG. 13 and described above) and/or may flow along the axis of the adapter through the pivotable door to atmosphere at 1422 (e.g., along the example flow path 1272 shown by FIG. 12A and FIG. 13 and described above). As another example, a first, smaller portion of vapor may flow along a path similar to flow path 1270, and a second, larger portion of vapor may flow along a path similar to flow path 1272. In one example, the pivotable door may be formed from a material permeable to DEF vapors (as described above) and the vapors may flow directly through the pivotable door. In another example, the pivotable door may include one or more venting channels (e.g., venting channels 700, 702, and 704 of refill adapter 200) surrounded at one end by a permeable membrane (e.g., permeable membrane 960 shown by FIG. 9B) and vapors may flow out of the adapter via the venting channels. In other examples, the DEF vapors may flow both directly through the pivotable door (e.g., via the vapor-permeable material) and through the venting channels of the pivotable door.

The method continues from 1418 to 1425 where the method includes removing the DEF nozzle from the adapter and returning the pivotable door to the closed position. Removing the DEF nozzle from the adapter at 1425 results in a biasing member (e.g., biasing member 906) pressing the pivotable door into the fully closed position against the aperture of the refill adapter.

The method continues from 1425 to 1427 where the method includes flowing DEF vapors radially into the adapter and ventilating DEF vapors along the axis of the adapter and out to atmosphere through the pivotable door. In one example, flowing DEF vapors radially into the adapter includes flowing vapors into the adapter via the main ventilation passage described above (e.g., during conditions in which the pivotable door is in the fully closed position).

For example, at 1427 vapor may flow into the main ventilation passage (e.g., from an external vapor passage coupled to the main ventilation passage), through a plurality of secondary ventilation passages (e.g., secondary ventilation passages 308), and into the flow passage of the refill adapter. The vapor from the main ventilation passage may flow (e.g., along flow path 1291) to atmosphere through the pivotable door. Vapor may additionally flow from the DEF storage reservoir through an opening of an end (e.g., opening 311 of first end 204) positioned opposite to the end including the pivotable door (e.g., second end 202) and through the flow passage of the refill adapter. The vapor flows through the flow passage and out to atmosphere through the pivotable door (e.g., along the flow path 1292). As vapor flows out of the DEF storage reservoir via the refill adapter as described above, atmospheric air may flow into the refill adapter via the pivotable door (e.g., along airflow path 1293).

If a DEF refill is not desired at 1404, the method continues from 1404 to 1412 where the method includes determining whether DEF injection is desired. In one example, the determination of whether DEF injection is desired may be performed by the controller based on a measured and/or estimated engine operating speed, engine temperature, engine fuel consumption rate, and/or temperature of one or more emissions control devices coupled to an exhaust passage (e.g., emission control devices 170 coupled to exhaust passage 135 as described above with reference to FIG. 1). For example, the controller may estimate and/or measure the engine fuel consumption rate based on an opening amount and/or duration of one or more engine fuel injectors (e.g., fuel injector 166 shown by FIG. 1 and described above) and may make a logical determination regarding whether DEF injection is desired based on logic rules that are a function of the engine fuel consumption rate. In another example, the controller may compare estimated and/or measured engine fuel consumption rate to fuel consumption rate values stored in a look-up table in non-transitory computer memory of the controller in order to determine whether DEF injection is desired. The controller may determine whether DEF injection is desired based on a calculation using the look-up table with the input being the engine fuel consumption rate and the output being DEF injection rate, for example.

If DEF injection is desired at 1412, the method continues from 1412 to 1414 where the method includes delivering diesel exhaust fluid to a catalyst from the reservoir. The controller may generate a control signal that is sent to a DEF injector (e.g., DEF injector 193 shown by FIG. 1 and described above) coupled to the exhaust passage, for example, in order to adjust a flow rate of DEF from the DEF injector into the exhaust passage. In one example, the controller may adjust a frequency, amplitude, and/or duration of an electrical signal transmitted to the DEF injector in order to adjust an amount and/or duration of opening of a nozzle of the DEF injector in order to deliver DEF to the catalyst via the exhaust passage. The method then continues from 1414 to 1418 where the method includes ventilating DEF vapors along the axis of the adapter as described above.

If DEF injection is not desired at 1412, the method continues from 1412 to 1416 where the method includes maintaining engine operating conditions. In one example, maintaining engine operating conditions may include maintaining (e.g., not adjusting) an engine speed, engine fuel consumption rate, exhaust gas flow rate, etc. The method then continues from 1416 to 1418 where the method includes ventilating DEF vapors along the axis of the adapter as described above.

The method continues from 1416 to 1427, and from 1414 to 1427, where the method includes flowing DEF vapors radially into the adapter and ventilating DEF vapors along the axis of the adapter and out to atmosphere through the pivotable door as described above.

Figure 15:
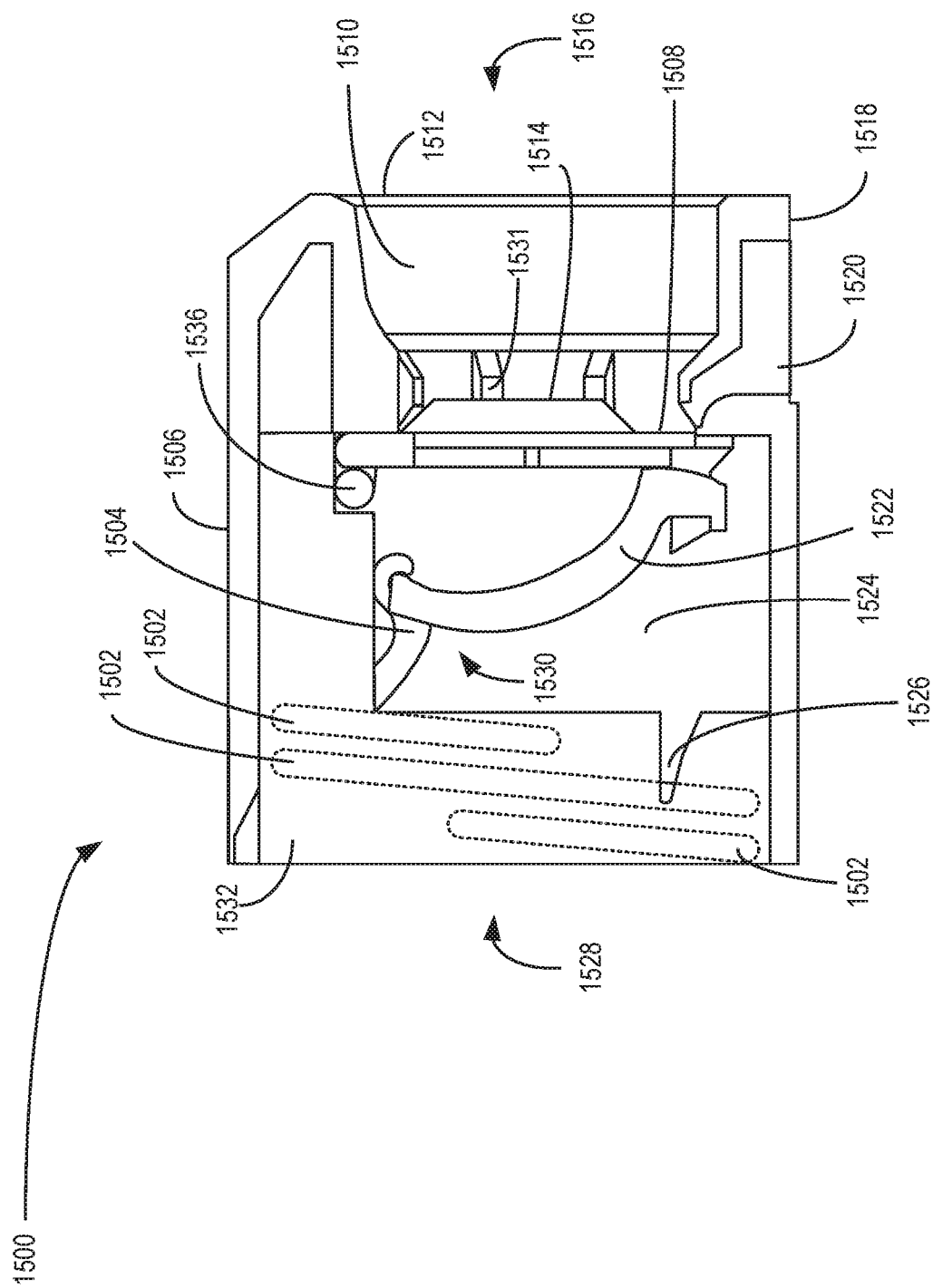
FIG. 15 shows an alternate embodiment of a refill adapter for a fluid refilling system, with the refill adapter including a threaded surface.

FIG. 15 shows an alternate embodiment of a refill adapter 1500 for a fluid refilling system. In some examples, the fluid refilling system may be similar to the DEF system 121 shown by FIG. 1 and described above. The refill adapter 1500 includes a threaded surface 1502 shaped to couple with a threaded surface of a fluid inlet of the fluid refilling system. For example, the fluid refilling system may include a flow passage similar to DEF flow passage 159 shown by FIG. 1 and described above, with the flow passage coupled to a fluid reservoir (similar to DEF tank 153). A first end of the flow passage may be coupled to an inlet (e.g., aperture) of the fluid reservoir, and a second end of the flow passage may include a threaded feature (e.g., one or more threaded surfaces positioned along an inner surface of the flow passage or an outer surface of the flow passage). The threaded surface 1502 of the refill adapter 1500 may engage with the threaded feature of the flow passage in order to couple the refill adapter 1500 to the flow passage. In some examples, the fluid refilling system may not include a flow passage and the fluid reservoir may instead include the threaded feature at the inlet of the fluid reservoir. In such examples, the refill adapter 1500 may couple directly to the inlet of the fluid reservoir via engagement of the threaded surface 1502 with the threaded feature of the inlet of the fluid reservoir.

The refill adapter 1500 includes a first end 1528 and a second end 1516. The second end 1516 is similar to the second end 1516 described above with reference to the embodiment of the refill adapter 200 shown by FIGS. 2-13. In particular, the second end 1516 of the refill adapter 1500 includes a pivotable door 1514, a nozzle insertion passage 1510, an opening 1512, an aperture 1508, an exterior surface 1518, a drain port 1520, and protrusions 1531 (similar to the pivotable door 208, nozzle insertion passage 205, opening 206, aperture 207, exterior surface 1254, drain port 1252, and protrusions 213, respectively) in a relative arrangement similar to the embodiment described above with reference to FIGS. 2-13. The pivotable door 1514 is coupled to a biasing member 1530 having a first section 1522 and a second section 1504, similar to the biasing member 906 having first section 1000 and second section 904 as described above. Hinge arms 1536 of the pivotable door 1514 (similar to hinge arms 902 of the pivotable door 208 described above) may be retained in their position within the refill adapter 1500 by an insert 1532 housed within an outer sleeve 1506. The insert 1532 may include a plurality of grooves 1526 shaped to couple with corresponding rails (not shown) of the outer sleeve 1506.

The first end 1528 of the refill adapter 1500 includes the threaded surface 1502. The threaded surface 1502 is positioned along an inner perimeter of an inner surface 1524 of the insert 1532. In some examples, the threaded surface 1502 may instead (or additionally) be positioned along an inner perimeter of the outer sleeve 1506. In yet other examples, the insert 1532 and outer sleeve 1506 may be formed together (e.g., molded together) as a single piece, and the threaded surface 1502 may be positioned along an inner perimeter of an inner surface of the single piece.

In some examples, the threaded surface 1502 of the refill adapter 1500 enables the refill adapter to couple to refilling systems having a corresponding threaded surface shaped to couple with threaded surface 1502, such as fluid reservoirs of washer fluid systems, watering cans, fuel cans (e.g., gasoline cans), fuel reservoirs of motorized machinery (e.g., lawnmowers), etc. In such examples, a size of various components of the refill adapter 1500 (e.g., a diameter of the opening 1512, a diameter of aperture 1508, a diameter between opposing protrusions 1531, a length of the nozzle insertion passage 1510, etc.) may be configured in order to enable a refilling nozzle with a particular length and/or diameter to be inserted into the refill adapter 1500, and to prevent nozzles without the particular length and/or diameter from being inserted into the refill adapter 1500. For example, embodiments of the refill adapter 1500 configured to couple to an inlet of a gasoline tank of a lawnmower may be sized to enable gasoline nozzles to be inserted into the refill adapter 1500 and to prevent other types of nozzles (e.g., diesel nozzles, DEF nozzles, etc.) from being inserted into the refill adapter 1500. In another example, embodiments of the refill adapter 1500 configured to couple with an inlet of a washer fluid reservoir of a washer fluid system may be sized to enable a washer fluid nozzle to be inserted into the refill adapter 1500 and to prevent other types of nozzles (e.g., gasoline nozzles, fuel additive bottle nozzles, etc.) from being inserted into the refill adapter 1500.

FIGS. 2-13 and FIG. 15 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The technical effect of positioning the magnetic ring downstream of the pivotable door and positioning the secondary ventilation passages to extend in the axial direction relative to the central axis is to decrease a length and diameter of the refill adapter. The additional ventilation passages formed by the pivotable door and the vapor-permeable material of the pivotable door may further increase an amount of ventilation through the refill adapter, thereby enabling a length of the main ventilation passage to be decreased and the diameter of the refill adapter to be decreased. By closing the aperture formed by the fluid passage within the refill adapter with the pivotable door, the refill adapter may be sealed without the use of caps, lids, plugs, etc., thereby reducing the length of the refill adapter. In this way, by decreasing the length and diameter of the refill adapter, the refill adapter may be included within a greater variety of fluid refilling systems (e.g., refilling systems having a reduced amount of space for installation of the refill adapter).

An adapter includes: a body including a first end shaped to couple with a diesel exhaust fluid (DEF) refill passage and a second end including an aperture shaped to receive a DEF nozzle; a pivotable door sealing the aperture and forming an external surface of the adapter; and a magnetic ring positioned within the body, downstream of the pivotable door between the first end and second end. In a first example of the adapter, an interior of the body forms a fluid passage, and wherein the fluid passage extends from the first end to the aperture. A second example of the adapter optionally includes the first example, and further includes a main ventilation passage formed by the body between the first end and the second end, the main ventilation passage extending in a radial direction relative to a central axis of the body. A third example of the adapter optionally includes one or both of the first and second examples, and further includes wherein the main ventilation passage is fluidly coupled to the fluid passage by a plurality of secondary ventilation passages extending in a direction parallel to the central axis. A fourth example of the adapter optionally includes one or more or each of the first through third examples, and further includes wherein the magnetic ring is positioned upstream of the main ventilation passage and the plurality of secondary ventilation passages relative to a direction of DEF flow from the DEF nozzle through the adapter. A fifth example of the adapter optionally includes one or more or each of the first through fourth examples, and further includes wherein the second end of the body forms a nozzle insertion passage extending in a direction away from the pivotable door and the first end, with the nozzle insertion passage in fluidic communication with atmosphere. A sixth example of the adapter optionally includes one or more or each of the first through fifth examples, and further includes wherein the pivotable door includes a protruding portion extending away from the aperture and into the nozzle insertion passage, and wherein the protruding portion includes a groove shaped to guide the DEF nozzle toward a midpoint of the pivotable door. A seventh example of the adapter optionally includes one or more or each of the first through sixth examples, and further includes a plurality of protrusions formed along a perimeter of the nozzle insertion passage and extending radially toward a central axis of the body. An eighth example of the adapter optionally includes one or more or each of the first through seventh examples, and further includes wherein the pivotable door is formed of a material permeable to DEF vapor. A ninth example of the adapter optionally includes one or more or each of the first through eighth examples, and further includes wherein the pivotable door includes a plurality of venting channels configured to flow DEF vapor from an interior of the adapter to atmosphere. A tenth example of the adapter optionally includes one or more or each of the first through ninth examples, and further includes wherein the body includes a first portion and a second portion, the second portion removably coupled to the first portion and partially surrounding the first portion, and wherein the first portion forms the first end and the second portion forms the second end. An eleventh example of the adapter optionally includes one or more or each of the first through tenth examples, and further includes wherein the first portion of the body includes a slot shaped to receive the magnetic ring, and wherein the magnetic ring is retained in face-sharing contact with the slot by the second portion of the body.

In one example, a method includes: delivering a diesel exhaust fluid (DEF) to a catalyst from a reservoir; receiving an inserted DEF nozzle against a pivotable door positioned at a first end of an adapter, the adapter having a second end coupled to the reservoir; coupling a magnetic field from the adapter to the DEF nozzle; and ventilating DEF vapors along an axis of the adapter and then radially out to atmosphere through a main ventilation passage radially extending from the adapter axis. In a first example of the method, ventilating DEF vapors along the axis of the adapter and then radially out to atmosphere includes: flowing DEF vapors from a location downstream of a tip of the DEF nozzle into a plurality of secondary ventilation passages located upstream of the tip relative to a flow of DEF from the DEF nozzle, the secondary ventilation passages being coupled to the main ventilation passage and extending in a direction of the adapter axis. A second example of the method optionally includes the first example, and further includes wherein coupling the magnetic field to the DEF nozzle includes inserting the DEF nozzle through a magnetized ring positioned between the main ventilation passage and the pivotable door in a direction of the adapter axis. A third example of the method optionally includes one or both of the first and second examples, and further includes ventilating DEF vapors along the axis of the adapter and then out to atmosphere through a venting channel formed by the pivotable door. A fourth example of the method optionally includes one or more or each of the first through third examples, and further includes ventilating DEF vapors along the axis of the adapter and then out to atmosphere directly through a portion of the pivotable door formed of a material permeable to DEF vapors.

In one example, a diesel exhaust fluid (DEF) system includes: a DEF storage reservoir; a DEF flow passage including a first end and a second end, the first end coupled to the DEF storage reservoir; and a fill adapter coupled to the second end of the DEF flow passage, the fill adapter including: a first opening and a second opening; an adapter flow passage formed by an inner surface of the fill adapter and fluidly coupling the first opening to the second opening; a pivotable door positioned within the adapter flow passage and sealing the first opening; and a magnetized ring positioned in face-sharing contact with the inner surface between the pivotable door and the second opening. In a first example of the DEF system, the fill adapter includes a biasing member biasing the pivotable door against the first opening, and wherein the biasing member is formed of a polymer material. A second example of the DEF system optionally includes the first example, and further includes wherein the fill adapter includes a vent passage fluidly coupled with the adapter flow passage and the DEF storage reservoir, wherein the vent passage is positioned between the magnetized ring and the second opening and extends in a direction away from the adapter flow passage, and wherein the vent passage is separated from the adapter flow passage by a grating.

In an alternate representation, a fill adapter for a diesel exhaust fluid (DEF) system includes: a DEF flow passage extending through the fill adapter and forming an exterior opening of the fill adapter; a pivotable door positioned within the DEF flow passage and biased against the exterior opening by a biasing member; and an annular magnet positioned around a perimeter of the DEF flow passage and downstream of the pivotable door. In a first example of the fill adapter, the biasing member includes a first portion and a second portion, the first portion coupled to the pivotable door and the second portion coupled to a slot formed by a surface of the DEF flow passage. A second example of the fill adapter optionally includes the first example, and further includes wherein the biasing member is formed of a polymer material, and wherein the polymer material is not chemically reactive with DEF. A third example of the fill adapter optionally includes one or both of the first and second examples, and further includes wherein an inner surface of the annular magnet forms a section of the DEF flow passage. A fourth example of the fill adapter optionally includes one or more or each of the first through third examples, and further includes a vapor relief passage fluidly coupled to the DEF flow passage and extending in a direction away from the DEF flow passage, the vapor relief passage coupled to a vent aperture at an outer surface of the fill adapter.

In another alternate representation, an adapter comprises: a body including a first end and a second end, the first end having a threaded surface shaped to couple with a threaded feature of a passage shaped to flow a fluid to a fluid reservoir, and the second end including an aperture shaped to receive a fluid flow nozzle; a pivotable door sealing the aperture and forming an external surface of the adapter, the pivotable door including a plurality of slots sealed by a membrane, the membrane being permeable to the fluid; and a biasing member biasing the pivotable door against the aperture, the biasing member including a first section pivotable relative to a second section.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An adapter, comprising:
a body including a first end shaped to couple with a diesel exhaust fluid (DEF) refill passage and a second end including an aperture shaped to receive a DEF nozzle;
a pivotable door sealing the aperture and forming an external surface of the adapter; and
a magnetic ring positioned within the body, downstream of the pivotable door between the first end and the second end, wherein the second end forms a nozzle insertion passage extending in a direction away from the pivotable door and the first end, with the nozzle insertion passage in fluidic communication with atmosphere, and wherein the nozzle insertion passage has a passage diameter less than 23.8 millimeters and a passage length greater than a length from a nozzle opening of a fuel additive bottle to a shoulder of the fuel additive bottle.

2. The adapter of claim 1, wherein an interior of the body forms a fluid passage, and wherein the fluid passage extends from the first end to the aperture.

3. The adapter of claim 2, further comprising a main ventilation passage formed by the body between the first end and the second end, the main ventilation passage extending in a radial direction relative to a central axis of the body.

4. The adapter of claim 1, wherein the pivotable door includes a protruding portion extending away from the aperture and into the nozzle insertion passage, and wherein the protruding portion includes a groove shaped to guide the DEF nozzle toward a midpoint of the pivotable door.

5. The adapter of claim 1, further comprising a plurality of protrusions formed along a perimeter of the nozzle insertion passage and extending radially toward a central axis of the body, and wherein a distance between opposing protrusions of the plurality of protrusions is less than 19.8 millimeters.

6. The adapter of claim 1, wherein the pivotable door is coupled to a permeable membrane formed of a material permeable to DEF vapor.

7. The adapter of claim 1, wherein the pivotable door includes a plurality of venting channels configured to flow DEF vapor from an interior of the adapter to atmosphere.

8. The adapter of claim 1, wherein the body includes a first portion and a second portion, the second portion removably coupled to the first portion and partially surrounding the first portion, and wherein the first portion forms the first end and the second portion forms the second end.

9. The adapter of claim 8, wherein the first portion of the body includes a slot shaped to receive the magnetic ring, and wherein the magnetic ring is retained in face-sharing contact with the slot by the second portion of the body.

10. An adapter, comprising:
a body including a first end shaped to couple with a diesel exhaust fluid (DEF) refill passage and a second end including an aperture shaped to receive a DEF nozzle;
a pivotable door sealing the aperture and forming an external surface of the adapter;
a magnetic ring positioned within the body, downstream of the pivotable door between the first end and the second end, wherein an interior of the body forms a fluid passage, and wherein the fluid passage extends from the first end to the aperture; and
a main ventilation passage formed by the body between the first end and the second end, the main ventilation passage extending in a radial direction relative to a central axis of the body, wherein the main ventilation passage is fluidly coupled to the fluid passage by a plurality of secondary ventilation passages extending in a direction parallel to the central axis.

11. The adapter of claim 10, wherein the magnetic ring is positioned upstream of the main ventilation passage and the plurality of secondary ventilation passages relative to a direction of DEF flow from the DEF nozzle through the adapter.

12. An adapter, comprising:
a body including a first end shaped to couple with a diesel exhaust fluid (DEF) refill passage and a second end including an aperture shaped to receive a DEF nozzle;
a pivotable door sealing the aperture and forming an external surface of the adapter, wherein the pivotable door includes a plurality of venting channels configured to flow DEF vapor from an interior of the adapter to atmosphere;
a magnetic ring positioned within the body, downstream of the pivotable door between the first end and the second end; and
a plurality of protrusions formed along a perimeter of a nozzle insertion passage and extending radially toward a central axis of the body.

13. The adapter of claim 12, wherein an interior of the body forms a fluid passage, and wherein the fluid passage extends from the first end to the aperture.

14. The adapter of claim 13, further comprising a main ventilation passage formed by the body between the first end and the second end, the main ventilation passage extending in a radial direction relative to the central axis of the body.

15. The adapter of claim 12, wherein the adapter includes a biasing member biasing the pivotable door against an opening, wherein the biasing member is formed of a polymer material, and wherein the pivotable door is formed of a material permeable to DEF vapors.

16. The adapter of claim 15, wherein the biasing member includes a first section and a second section, with the first section being coupled to the pivotable door and the second section including a hooked portion coupled with a slot formed by a perimeter surface of the body.

17. The adapter of claim 12, wherein the pivotable door includes a protruding portion extending away from the aperture and into the nozzle insertion passage, and wherein the protruding portion includes a groove shaped to guide the DEF nozzle toward a midpoint of the pivotable door.

18. The adapter of claim 12, wherein a distance between opposing protrusions of the plurality of protrusions is less than 19.8 millimeters.

* * * * *